(12) United States Patent
Sariel et al.

(10) Patent No.: US 7,194,139 B1
(45) Date of Patent: Mar. 20, 2007

(54) IMAGE COMPRESSION

(75) Inventors: Aviram Sariel, Ramot-Hashavim (IL); David Mendlovic, Petach-Tikva (IL); Uzi Efron, Herzelia (IL); Ido Raveh, Caesaria (IL); Gal Shabtay, Petach-Tikva (IL); Zeev Zalevsky, Rosh-Haayin (IL); Uriel Levy, Petach-Tikva (IL); Naim Konforti, Holon (IL); Amir Shemer, Ramat-Gan (IL); Dan Shklarsky, Haifa (IL); Nadav Cohen, Tel-Aviv (IL)

(73) Assignee: Lenslet Ltd., Ramat-Gan (IL)

( * ) Notice: Subject to any disclaimer, the term of this patent is extended or adjusted under 35 U.S.C. 154(b) by 0 days.

(21) Appl. No.: 09/926,547

(22) PCT Filed: Sep. 5, 1999

(86) PCT No.: PCT/IL99/00479

§ 371 (c)(1),
(2), (4) Date: Mar. 5, 2002

(87) PCT Pub. No.: WO00/72267

PCT Pub. Date: Nov. 30, 2000

(30) Foreign Application Priority Data

May 19, 1999 (IL) ........................... 130038
Jul. 25, 1999 (IL) ........................... 131094

(51) Int. Cl.
*G06K 9/36* (2006.01)
*G06K 9/46* (2006.01)

(52) U.S. Cl. .............. 382/250; 382/166; 382/251; 382/103; 359/560; 359/558

(58) Field of Classification Search ........ 382/250–251, 382/232–233, 239, 245–246, 280, 218, 211, 382/103, 127, 116; 359/107, 558, 559, 290, 359/561, 601, 29; 708/816, 402, 403, 405, 708/821
See application file for complete search history.

(56) References Cited

U.S. PATENT DOCUMENTS 3,872,293 A * 3/1975 Green ........................ 708/821
3,969,699 A 7/1976 McGlaughlin
4,005,385 A 1/1977 Joynson et al.

(Continued)

FOREIGN PATENT DOCUMENTS

EP 0 577 258 1/1994

(Continued)

OTHER PUBLICATIONS

Strang, G. et al.; "Wavelets and Filter Banks"; Wellesly-Cambridge Press; 1997, pp. 501-513.

(Continued)

*Primary Examiner*—Kanjibhai Patel
*Assistant Examiner*—Ali Bayat
(74) *Attorney, Agent, or Firm*—Fenster & Company

(57) ABSTRACT

A method of image compression, comprising: providing image-data encoding light; transforming said light from an image space to a transform space utilizing an optical component; and converting said transformed light into electrical signals, which electrical signals represent a compressed representation of said image data.

47 Claims, 13 Drawing Sheets

U.S. PATENT DOCUMENTS

| | | | |
|---|---|---|---|
| 4,354,247 A | 10/1982 | Yao | |
| 4,413,909 A | 11/1983 | Pohle | |
| 4,460,969 A | 7/1984 | Chen et al. | |
| 4,590,608 A | 5/1986 | Chen et al. | |
| 4,615,619 A | 10/1986 | Fateley | |
| 4,847,796 A | 7/1989 | Aleksoff et al. | |
| 4,892,370 A | 1/1990 | Lee | |
| 4,892,408 A | 1/1990 | Pernick et al. | |
| 4,972,498 A | 11/1990 | Leib | |
| 5,072,314 A | 12/1991 | Chang | |
| 5,080,464 A | 1/1992 | Toyoda | |
| 5,107,351 A | 4/1992 | Leib et al. | |
| 5,216,529 A | 6/1993 | Paek et al. | |
| 5,227,886 A | 7/1993 | Efron et al. | |
| 5,235,439 A | 8/1993 | Stoll | |
| 5,262,979 A | 11/1993 | Chao | |
| 5,274,716 A | 12/1993 | Mitsuoka et al. | |
| 5,327,286 A | 7/1994 | Sampsell et al. | |
| 5,339,305 A | 8/1994 | Curtis et al. | |
| 5,384,573 A * | 1/1995 | Turpin | 342/179 |
| 5,394,257 A * | 2/1995 | Horan et al. | 359/107 |
| 5,420,826 A * | 5/1995 | Abramovitz | 367/100 |
| 5,454,047 A | 9/1995 | Chang et al. | |
| 5,537,492 A * | 7/1996 | Nakajima et al. | 382/232 |
| 5,675,670 A | 10/1997 | Koide | |
| 5,790,686 A | 8/1998 | Koc et al. | |
| 5,867,386 A * | 2/1999 | Hoffberg et al. | 700/83 |
| 6,314,210 B1 | 11/2001 | Fukushima et al. | |
| 6,529,614 B1 * | 3/2003 | Chao et al. | 382/103 |
| 2005/0031221 A1 * | 2/2005 | Ludwig | 382/255 |

FOREIGN PATENT DOCUMENTS

| | | |
|---|---|---|
| JP | 57-10123 | 1/1982 |
| JP | 2-120917 | 5/1990 |
| JP | 2-127625 | 5/1990 |
| JP | 7-143484 | 6/1995 |
| JP | 8-129197 | 5/1996 |

OTHER PUBLICATIONS

Akiba, A. et al.; "Fundamental Study on a Microoptic Image Preprocessor Composed of Planar Microlens Array;" Aug. 1991; Journal: Optics; vol. 20; No. 8; pp. 507-513.

Cohn, R. W.; Link Analysis of a Deformable Mirror Device Based Optical Crossbar Switch; Jan. 1992; Optical Engineering; vol. 31; No. 1; pp. 134-140.

Farr, K. B. et al.; "Lens Design for a White-Light Cosine-Transform Achromat;" Jan. 1, 1995; Applied Optics; vol. 34; No. 1; pp. 128-137.

Feitelson, D.; "Optical Computing;" Chapter "Optical Image and Signal Processing;" MIT Press 1988; pp. 102-104 and 117-129.

Fukui, M.; "Optoelectronic Parallel Computing System with Optical Image Crossbar Switch;" Nov. 10, 1993; Applied Optics; vol. 32; No. 32; pp. 6475-6481.

George, N. et al.; "Cosinusoidal Transform in White Light;" Mar. 15, 1984; Applied Optics; vol. 23; No. 6; pp. 787-797.

Goutin, P. et al.; "Some new Result in Hybrid Acousto-Optic Processing;" Oct. 1992; Proceedings of the IEEE Ultrasonics Symposium; vol. 1; pp. 493-496.

Kirk, A. G. et al.; "Experimental Implementation of an Optoelectronic Matrix-Matrix Multiplier which Incorporates Holographic Multiple Imaging;" Dec. 1992; Optical Computing and Processing; vol. 2; No. 4; pp. 293-304; XP361747.

Koc, U. et al.; "DCT-Based Motion Estimation;" Jul. 1998; IEEE Transactions on Image Processing; vol. 7; No. 7; pp. 948-965.

Koc, U.; "Low Complexity and High Throughput Fully DCT-Based Motion Compensated Video Coders;" presented in 1996 to Ray Liu, K. J. of the Institute for Systems Research; University of Maryland; Harvard University and Industry.

Marom, D. M. et al.; "Compact All-Optical Bypass-Exchange Switch;" Jan. 10, 1996; Applied Optics; vol. 35; No. 2; pp. 248-253.

Nomura, K. et al.; "Hartley Transformation for Hybrid Pattern Matching;" Oct. 10, 1990; Applied Optics; vol. 29; No. 29; pp. 4345-4350.

Rao, K. R. et al.; "Decimation-in-Time (DIT) and Decimation-in-Frequency (DIF) Algorithms;" 1990; DCT-Algorithms, Advantages Applications; Chapter 4.4; Academic Press Inc.; pp. 56-61.

Stone, T. W. et al.; "Optical Array Generation and Interconnection Using Birefringent Slabs;" Jan. 10, 1994; Applied Optics; vol. 33; No. 2; pp. 182-191.

Yatagai, T.; "Optical Computing in Japan;" Oct. 1998; Future Generation Computer Systems; vol. 4; No. 3; pp. 177-187; XP000111373.

"Performance of 4×4 Optical Crossbar Switch Utilizing Acousto-Optic Deflector;" Feb. 16, 1989; Electronics Letters; vol. 25; No. 4; pp. 252-253.

Akitoshi, Y. et al.; "Optical Computing Techniquesfor Image/Video Compression;" Proceedings of the IEEE; US; New York; vol. 82; No. 6; pp. 948-954; XP000438344.

Armand, A. et al.; "Real-Time Parallel Optical Analog-to-Digital Conversion;" Mar. 1980; Optics Letters; vol. 5; No. 3.

Brenner, K. H. et al.; "Implementation of an Optical Crossbar Network Based on Directional Switches;" May 10, 1992; Applied Optics; vol. 31; No. 14; pp. 2446-2451.

Cheng, L. M. et al.; "Optical Cosine Transform Using Phase Conjugation Technique;" Sep. 16-18, 1991; Proceedings of Third International Conference on Holographic Systems, Components and Applications; Organized by Electronics Division of the Institution of Electrical Engineers; pp. 114-117.

Fukui, M. et al.; "High-ThroughputOptical Image Crossbar Switch that Uses a Point Light Source Array;" Mar. 1, 1993; Optics Letters; vol. 18; No. 5; pp. 376-378.

Gonzalez, R. C. et al., "Digital Image Processing;" 1992; Addison Wesley Publishing Company; pp. 84-119, 142-145, and 374-381; ISBN 0-201-50803-6.

Goodman, J. W. et al.; "Fully Parallel, High-Speed Incoherent Optical Method for Performing Discrete Fourier Transforms;" Jan. 1978; Optics Letters; vol. 2; No. 1; pp. 1-13.

Gourlay, J. et al.; "Hadamard Transform Image Processing and Its Optical Implementation with Ferroelectric Liquid Crystal Spatial Light Modulators;" Jan./Feb. 1995; International Journal of Optoelectronics(Incl. Optical Computing & Processing); GB; Taylor & Francis; London; vol. 10; No. 1; pp. 51-58; XP000582638.

Hamanaka, K. et al.; "Multiple Imaging and Multiple Fourier Transformation using Planar Micorlens Arrays;" Oct. 1, 1990; Applied Optics; vol. 29; No. 28; pp. 4064-4070.

Harmuth, H. F.; "Sequency Theory—Foundations and Applications;" 1977; Academic Press; pp. 1-121.

Lee, J. N.; "Acouto-Optic Techniques for Information Processing Systems;" Oct. 14-16, 1987; IEEE Ultrasonics Symposium; vol. 1; pp. 475-484.

Marom, D. M. et al.; "All-Optical Reduced State 4=4 switch;" Mar. 1996; Optics and Photonics News; p. 43; column 3.

Wang, N. et al.; "Cantor Network, Control Algorithm, Two-Dimensional Compact Structure and Its Optical Implementation;" Dec. 10, 1995; Applied Optics; vol. 34; No. 35; pp. 8176-8182.

Wu, Y. et al.; "Optical Crossbar Elements Used for Switching Networks;" Jan. 10, 1994; Applied Optics; vol. 33; No. 2; pp. 175-178.

Yu, F. T. S. et al.; "Optical Signal Processing, Computing, and Neural Networks;" 1992; John Wiley & Sons, Inc.; Sections 8.7 and 8.8; pp. 308-319 and 326-329.

* cited by examiner

IMAGE COMPRESSION

RELATED APPLICATIONS

This application is a U.S. national filing of PCT Application No. PCT/IL99/00479, filed Sept. 5, 1999.

FIELD OF THE INVENTION

The present invention relates to the field of optical processing and especially to compressing images using optical components.

BACKGROUND OF THE INVENTION

Often, the information bandwidth to be transmitted is greater than the available bandwidth. Therefore, information is often compressed before it is transmitted (or stored), to reduce the required bandwidth. For example, the HDTV standard was defined, at its inception, to include compression. Many types of signals are compressed, including still images, video and telephone conversations. The reigning compression standards are JPEG for still images and MPEG (I, II, III or IV) for video. In actuality, these standards are standards for the compressed signals. There is no particular requirements, in the standard, on the method for converting the uncompressed signals into compressed signals.

Compression and in some cases decompression are often very demanding and typically require dedicated hardware. Both JPEG and MPEG are transform-based methods, in which the uncompressed data is transformed into a transform space, where the data is represented by a set of coefficients. It is usually desirable that the coefficients have less autocorrelation than the image data or even no autocorrelation at all. Although the DCT transform does not completely decorrelate the coefficients, the correlation between them is significantly reduced. In other compression methods, other transform spaces are used. In transform space, some of the coefficients have a greater visual and/or other effect on the image, than other coefficients. To obtain compression, the coefficients are quantized, with fewer bits being allocated to those coefficients which have a lesser effect. Typically, a coefficient is quantized by dividing it by a weight and then rounding or truncating the result.

Optical and electro-optical processors have been used in the art, to a small extent, for computationally demanding applications. However, with the advent of very fast electronic computer components and parallel processors, their acceptance has been limited.

Performing some types of linear transforms, for example Fourier transforms, continuous cosine transforms and Walash transforms, using optical components is well known, for example, as described in "Cosinusoidal Transforms in White Light", by N. George and S. Wang, in *Applied Optics*, Vol. 23, No. 6, Mar. 15, 1984, in "Hartley Transforms for Hybrid Pattern Matching", by Nomura, K. Itoh and Y. Ichioka, in *Applied Optics*, Vol. 29, No. 29, Oct., 10, 1990, in "Lens Design for a White-Light Cosine-Transform Achromat", by K. B. Farr and S. Wang, in Applied Optics, Vol. 34, No. 1, Jan. 1, 1995 and in "Optical Computing", by D. Feitelson, in a chapter titled "Optical Image and Signal Processing", pp. 102–104 (which pages describe general discrete linear transforms using a lenslet array), and pp. 117–129 (which describe matrix multiplication), MIT Press 1988, the disclosures of which are incorporated herein by reference.

SUMMARY OF THE INVENTION

An object of some preferred embodiments of the invention is efficient and/or fast generation of compressed still and moving images, especially transform based compression methods. In a preferred embodiment of the invention, this object is achieved by using optical components which perform specific steps of a compression method. Some compression methods utilize models, e.g., of visual perception to provide lossy compression. In a preferred embodiment of the invention, the optical components used are selected to match physical processes and/or models which are mimicked by the compression method. Alternatively or additionally, the optical components are selected to perform computation-intensive steps, for example transforms, which can be performed effectively using optical components.

A compression system in accordance with a preferred embodiment of the invention preferably comprises five stages, an input which receives the data to be compressed, an optional pre-processing stage which converts the representation of the data into a presentation more suitable for processing, a processing stage which performs the compression, an optional post processing stage which converts the representation of the compressed data into one suitable for output and an output stage which outputs the data. In a preferred embodiment of the invention, some or all of the stages are optical. In some embodiments, one or more electronic or hybrid electronic and optical stages may be used, for example for pre-processing the data. Additionally, in some embodiments, only some of the processing is performed optically, with the balance of the processing preferably being performed electronically.

An aspect of some preferred embodiments of the invention relates to optical block transforms, especially of image data. In a preferred embodiment of the invention, an optical component is used to transform image data in blocks, with each block being transformed separately. In a preferred embodiment of the invention, the transform used is a DCT (Discrete Cosine Transform) transform, preferably a JPEG-DCT, which is the DCT transform variant used for JPEG. Alternatively or additionally, the transform is a wavelet transform, such as the S transform, S+P transform family, other integer to integer "wavelet-like" transforms, or general known wavelet transform (Daubechies etc.) useful for wavelet compression.

Preferably, the block size is 8×8, which is a standard block size for many applications. Alternatively, different block sizes may be used, for example 16×16 or 64×64, possibly with different block sizes and/or block aspect ratios for different parts of the image. For wavelet transforms, larger blocks are preferably used.

An aspect of some preferred embodiments of the invention relates to performing a DCT (Discrete Cosine Transform) using optical processing, preferably a JPEG-DCT. In a preferred embodiment of the invention, a single optical element is used to transform data from an image domain to a DCT domain. A related aspect is an optical element which performs discrete wavelet and "integer to integer" wavelet transforms (such as the S and S+P transforms), for example using a combination of diffraction gratings neutral density filters (for weighting sums and differences).

An aspect of some preferred embodiments of the invention relates to a block-DCT-transforming lens, preferably a JPEG-DCT performing lens. In a preferred embodiment of the invention, such a lens comprises a two dimensional matrix of groups of optical elements, each such group performing a DCT on a single block. Preferably, such a group comprises a lenslet array which performs the DCT directly. Alternatively, the matrix comprises a matrix of optical elements, with each optical element performing a DCT transform for a single block. Alternatively to performing a DCT transform, a correspondence between JPEG DCT and DFT (Discrete Fourier Transform) may be utilized, so that a Fourier-transforming lens (or optical element or lenslet array) is used. Preferably, optical or electrical components are provided to modify the data and/or the transformed data so that the Fourier lens generate a DCT transform, at least for real image data. Alternatively to block-DCT lens, a lens for performing other types of block transforms, such as a block-Wavelet-transform, can be provided.

An aspect of some preferred embodiments of the invention relates to performing optical motion estimation. In a preferred embodiment of the invention, the motion estimation is performed on block-DCT-transformed data, by comparing DCT coefficients of neighboring blocks. Preferably the same hardware is used to perform DCT for motion estimation and for image compression. Alternatively or additionally to motion estimation, motion compensation may also be performed by correcting DCT coefficients of transformed data.

An aspect of some preferred embodiments of the invention relates to data compression using optical components. In various preferred embodiments of the invention, individual steps of image compression methods are performed using optical components. In some preferred embodiments of the invention, multiple sequential steps are implemented using optical components, possibly without conversion back to electrical signals in-between steps.

In a preferred embodiment of the invention, the data compressed is image data. Preferably, compression method is a transform based method, especially a DCT based method, such as JPEG or MPEG. Alternatively or additionally, other type of data compression which require processing (not spatial zooming) may be used, for example, entropy encoding. In a preferred embodiment of the invention, at least the DCT and/or motion estimation steps used for the above compression methods are performed optically. Alternatively, the compression method is a wavelet based compression method.

Alternatively or additionally to compression, data decompression may be effected using optical processing, for example to perform an inverse DCT.

An aspect of some preferred embodiments of the invention relates to direct acquisition of images which are compressed, partially compressed or pre-processed for rapid compression. In a preferred embodiment of the invention, a camera uses a DCT-transforming lens, which receives light from an imaged object and projects a transform of the light onto an optical detector, such as a CCD, for data acquisition. Alternatively, other types of optical detectors, such as a CMOS detector may be used. Preferably, but not necessarily, other optical elements are provided between the DCT lens and the CCD to perform further optical processing and/or image compression on the data. Alternatively or additionally, optical and/or electro-optical elements are provided between the object and the DCT lens to perform pre-processing on the optical data, for example to change its data representation scheme, or to better process polychromatic light. In a preferred embodiment of the invention, the DCT lens accepts polychromatic light. Alternatively, color information is separated out of the light received from the imaged object and the DCT lens accepts monochromatic light. In a preferred embodiment of the invention, the optical processing is use to perform or aid in performing JPEG or MPEG compression. Alternatively or additionally, other compression protocols are performed. Alternatively to DCT lens, other block-transform lens may be provided, for example for an S-transform.

An aspect of some preferred embodiments of the invention relates to using a continuous Fourier-transform optical system, for example a Fourier lens, for performing a discrete transform. In a preferred embodiment of the invention, data to the Fourier lens is matched to a data receptor at the other side of the Fourier lens to allow a discrete transform to be performed.

An aspect of some preferred embodiments of the invention relates to determining a matching between an SLM and a CCD to allow the use of Fourier optics for performing transforms, such as linear transforms. In a preferred embodiment of the invention, the size of elements in the CCD and the SLM is matched. Alternatively or additionally, one or more continuous spatially varying neutral density filter is used to match the CCD to the SLM.

An aspect of some preferred embodiments of the invention relates to using a discrete level SLM for performing transforms and/or other processing, rather than using a continuous level SLM. Preferably, a binary level SLM is used. In a preferred embodiment of the invention, data is encoded in bits, using a spatial and/or temporal encoding scheme using a binary SLM. Each such bit is then transformed individually and the result of the transform of the original data is determined by weighted summing of the transformed bits. One advantage of binary SLMs is that they are often much faster than gray-level SLMs. Another possible advantage is that there are no phase differences between pixels, in some implementations. Another possible advantage is that a smaller dynamic range CCD can be used. Another possible advantage is that lower cost driving circuitry and/or SLMs may be sued, as linearity of the SLM is not generally an issue in binary SLMs. Another possible advantage is that absolute uniformity of intensity is not as strictly required in binary SLMs as in gray-level SLMs. Some of these advantages may also hold for continuous gray-level SLMs driven as Binary SLMs. This scheme may be used for linear transforms and especially for DCT and FFT transforms, as desirable in some preferred embodiments of the invention. It should be noted that bases other than two may be used, for example base three, in which a different tradeoff between SLM speed and system complexity may be achieved. Alternatively or additionally, other numbers of discrete gray levels may be utilized in an SLM, for example to trade off speed and component complexity. Alternatively or additionally to breaking down data using number representation methods, other ways schemes of representing data as a combination of other data can be used. in one example the original data is separated in to a plurality of channels using a plurality of basis vectors (not 1, 2, 4 . . . 256, which are the basis vectors for binary representation, described above), each channel being processed and then combined after the processing.

An aspect of some preferred embodiments of the invention relates to reducing interactions between light from adjacent pixels or pixel groups. In a preferred embodiment of the invention, one or more of the following separation methods are practiced: frequency separation, spatial separation (preferably with a light absorbing or light redirecting separator between adjacent pixels), polarization axis differences, temporal offset and/or their combinations.

An aspect of some preferred embodiments of the invention relates to using optical switching technology for transforming data or for otherwise processing data encoded using light waves. Preferably, calcite or other bi-refringent materials are used to split light beams, each original light beam representing a pixel or a part thereof. The split light beams are then added, subtracted and/or multiplied by constants to perform the required calculations (such as a DCT transform or a DWT transform), with the end result of the addition and subtraction being light waves encoding the transformed data. Alternatively to calcite, diffractive or refractive optical elements may be used to split the beams of light.

There is thus provided in accordance with a preferred embodiment of the invention, a method of image compression, comprising:

providing image-data encoding light;

transforming said light from an image space to a transform space utilizing an optical component; and converting said transformed light into electrical signals, which electrical signals represent a compressed representation of said image data. Preferably, said converting comprises converting after quantization.

There is also provided in accordance with a preferred embodiment of the invention, a method of image de-compression, comprising:

providing compressed-image-data encoding light;

transforming said light from a transform space to an image space utilizing an optical component; and converting said transformed light into electrical signals, which electrical signals represent said image data.

In a preferred embodiment of the invention, said transforming comprises transforming using one or more optical elements which perform a block transform. Preferably, said one or more optical elements comprises a matrix of optical lens elements. Preferably, at least one of said optical lens elements comprises a lenslet array which performs a block transform for a single block.

In a preferred embodiment of the invention, said one or more optical elements comprises an element which performs a vector by matrix multiplication. Alternatively or additionally, said one or more optical element comprises a refractive element. Preferably, said refractive element comprises a bi-refringent material. Alternatively or additionally, said refractive element splits and combines beams representing individual data elements of said data.

In a preferred embodiment of the invention, said one or more optical elements comprises an element which generates a matrix product. Preferably, said matrix product comprises a triple matrix product.

In a preferred embodiment of the invention, said transforming utilizes at least one electrical component for transferring data between said at least one optical component.

In a preferred embodiment of the invention, said image is compressed using a JPEG standard. Alternatively or additionally, said image is compressed using an MPEG standard. Alternatively or additionally, said image is compressed using a wavelet compression method. Alternatively or additionally, said image data represents an image sequence. Alternatively or additionally, said providing comprises providing data encoded using discrete levels. Preferably, the data is provided as binary encoded data. Alternatively, the data is provided using a base three representation.

There is also provided in accordance with a preferred embodiment of the invention, apparatus for direct acquisition of compressed image data, comprising:

at least one optical element which receives light waves from an imaged object and which transforms said image into a transform space; and an optical detector which receives said transformed light and generates electronic signals responsive to said received light. Preferably, the apparatus comprises an optical quantizer which quantizes said transformed light prior to its reception by said detector.

Alternatively, the apparatus comprises an electronic quantizer which quantizes said electronic signals to produce compressed data.

In a preferred embodiment of the invention, said optical detector quantizes said light.

In a preferred embodiment of the invention, said at least one optical element comprises a single optical element which performs said transforming. Alternatively or additionally, the apparatus comprises a storage unit for storing at least one set of said electronic signals, corresponding to a still image. Alternatively or additionally, the apparatus comprises a storage unit for storing at least one set of said electronic signals, corresponding to an image sequence. Alternatively or additionally, said transform space comprises a DCT transform space. Alternatively, said transform space comprises a wavelet transform space.

In a preferred embodiment of the invention, said optical element comprises a planar two dimensional imager sandwiched to a planar two dimensional reflective spatial light modulator (SLM). Preferably, individual cells of said SLM are wired in parallel to individual cells of said planar imager.

There is also provided in accordance with a preferred embodiment of the invention, a block-transform optical element, comprising:

a plurality of optical groups each group comprising at least one optical sub-element, wherein each of said optical groups transforms a block of data. Preferably, said at least one sub-element comprises a lenslet array portion. Alternatively or additionally, said plurality of optical groups are arranged as a matrix. Alternatively or additionally, said element performs a JPEG-DCT transform. Alternatively, said element performs an inverse DCT transform. Alternatively, said element performs a wavelet transform.

In a preferred embodiment of the invention, said optical element performs said transform on data arranged as a spatially impulse image. Alternatively or additionally, said optical element performs said transform on data arranged as a continuous image.

In a preferred embodiment of the invention, said transform comprises a linear transform. Alternatively or additionally, said transform comprises a non-separable transform.

In a preferred embodiment of the invention, said optical groups overlap. Alternatively, said optical groups do not overlap.

There is also provided in accordance with a preferred embodiment of the invention, a method of DCT-like transforming of data, comprising:

providing optical waves which encode said data; and passing said waves through at least one optical element, which optical element modifies said optical waves into second optical waves carrying a transform of said data. Preferably, said transform comprises a block transform. Alternatively or additionally, said at least one optical element is an atomic optical element. Alternatively, said at least one optical element comprises a plurality of optical elements.

In a preferred embodiment of the invention, said at least one optical element comprises a discrete optical processing element. Alternatively, said at least one optical element comprises substantially only continuous optical processing element.

In a preferred embodiment of the invention, said transform is a JPEG-DCT transform. Alternatively, said transform is an inverse DCT transform.

There is also provided in accordance with a preferred embodiment of the invention, a method of optical motion estimation, comprising:

providing a first set of light waves encoding data of a first image block;

DCT transforming said first set of light waves using an optical component;

providing a second set of light waves encoding data of a second image block;

DCT transforming said second set of light waves using an optical component; and processing said first and said second DCT transformed data sets to determine an amount of relative motion of said two blocks. Preferably, both of said DCT transforms utilize a same optical component for said transforming. Alternatively or additionally, said processing comprises electronically processing said transformed data sets. Alternatively or additionally, the method comprises utilizing said determined motion for generating a compressed image stream.

There is also provided in accordance with a preferred embodiment of the invention, a method of transforming data using a discrete transform, comprising:

preprocessing said data to yield optically encoded data;

Fourier transforming said data using a Fourier lens; and postprocessing said data to yield transformed data. Preferably, said preprocessing comprises optically preprocessing. Preferably, said preprocessing comprises matching said data to said postprocessing. Preferably, said postprocessing comprises acquiring said data and wherein said matching comprises matching to said acquisition. Preferably, said postprocessing comprises spatially modulating said light.

In a preferred embodiment of the invention, said preprocessing comprises spatially modulating said light.

In a preferred embodiment of the invention, said spatially modulating comprises masking said data using an array of pinholes. Alternatively, said spatially modulating comprises continuously varying said amplitude of said data.

In a preferred embodiment of the invention, said preprocessing comprises mirroring said data. Alternatively or additionally, said transform comprises a JPEG-DCT transform. Alternatively, said transform comprises a wavelet transform.

In a preferred embodiment of the invention, said transform comprises an inverse DCT transform.

There is also provided in accordance with a preferred embodiment of the invention, apparatus for compressed image data manipulation, comprising:

an input for receiving data;

at least one optical component for transforming said data between an image space and a transform space; and an output for outputting said manipulated data. Preferably, said received data comprises uncompressed image data and the apparatus comprises a processor for processing said data after said transform to yield compressed image data to be outputted.

In a preferred embodiment of the invention, said received data comprises compressed image data and the apparatus comprises a processor for processing said data before said transform to yield transform data to be transformed by said optical component for said output. Preferably, said processor includes an optical D/A converter. Alternatively or additionally, said processor comprises an optical multiplier for de-quantizing data. Alternatively or additionally, said processor performs at least some of its processing on optic waves.

In a preferred embodiment of the invention, said processor performs at least some of its processing on electronic signals. Alternatively or additionally, the apparatus comprises an optical motion estimator. Preferably, said optical motion estimator utilizes said optical component for optical motion estimation. Alternatively or additionally, said optical motion estimator includes at least one electronic component.

In a preferred embodiment of the invention, the apparatus comprises an optical motion compensator. Preferably, said optical motion compensator utilizes said optical component for optical motion compensation. Alternatively or additionally, said optical motion compensator includes at least one electronic component.

In a preferred embodiment of the invention, said data is compressed using a JPEG compression. Alternatively, said data is compressed using a wavelet compression. Alternatively, said data is compressed using an MPEG compression.

In a preferred embodiment of the invention, said data comprises an image sequence. Alternatively, said data is a single image.

In a preferred embodiment of the invention, said data is manipulated as blocks. Preferably, at least two of said blocks are manipulated in parallel. Alternatively or additionally, at least two of said blocks are manipulated in series and the apparatus comprises a buffer circuit for directing said blocks in series into a single optical component.

In a preferred embodiment of the invention, said optical component comprises a discrete data transforming optical element. Alternatively or additionally, said optical component comprises a holographic lens. Alternatively or additionally, said optical component comprises an acousto-optic element. Alternatively or additionally, said optical component comprises an optical analog to digital converter. Alternatively or additionally, said optical component comprises an optical digital to analog converter. Alternatively or additionally, said optical component comprises a matrix product calculating element. Alternatively or additionally, said input comprises a binary SLM (spatial light modulator). Alternatively or additionally, said input is matched to said output to account for non-point light sources and detectors. Alternatively or additionally, said apparatus processes a plurality of data blocks in parallel. Preferably, different data blocks are encoded differently, to reduce cross-talk between them. Preferably, said different encodings comprises different polarizations. Alternatively or additionally, said different encodings comprises different light frequencies.

In a preferred embodiment of the invention, the apparatus comprises light attenuators arranged to attenuate light leaking between areas processing different data blocks. Preferably, said attenuators comprises solid attenuators Alternatively, said attenuators comprises a plurality of attenuator portions spaced apart along a main propagation axis of light, such that leakage light impinges on said at least one of said attenuator portions at a substantially perpendicular angle.

In a preferred embodiment of the invention, said attenuators are formed of at least one stack of transparent optical material having a plurality of light absorbing areas defined thereon, which light absorbing areas do not extend vertically in a continuous manner through said stack.

In a preferred embodiment of the invention, said optical component comprises a bi-refringent material. Preferably, said material comprises calcite.

In a preferred embodiment of the invention, said optical component splits and combines light beams representing separate data elements.

There is also provided in accordance with a preferred embodiment of the invention, a method of data processing, comprising:

spatially encoding light to carry said data using a discrete-level SLM (spatial light modulator);

applying a linear transform to said data using one or more optical components to manipulate said light; and detecting said manipulated light using a spatial light detector. Preferably, said SLM is driven as a binary SLM. Alternatively said SLM is driven as a three gray-level SLM.

In a preferred embodiment of the invention, spatially encoding said data comprises splitting said data into separate planes, each representing one ordinal position of said digital representation and comprising combining said manipulated light. Preferably, said light is combined optically. Alternatively, said light is combined electronically, after detection.

In a preferred embodiment of the invention, said transform comprises a DCT transform. Alternatively, said transform comprises a Fourier transform.

BRIEF DESCRIPTION OF THE DRAWINGS

The present invention will be more clearly understood from the following detailed description of the preferred embodiments of the invention and from the attached drawings, in which.

DETAILED DESCRIPTION OF PREFERRED EMBODIMENTS

Figure 1:
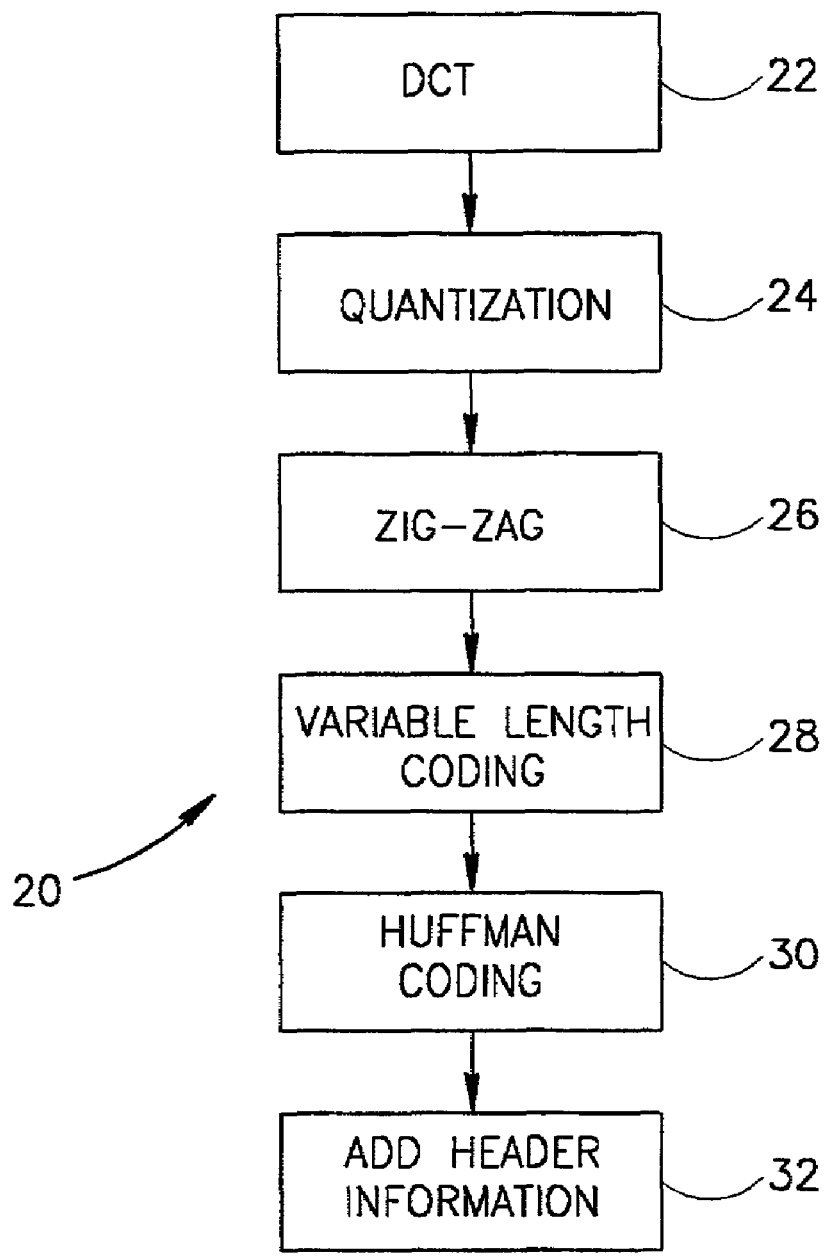
FIG. 1 is a flowchart of a baseline method of JPEG-compliant compression.

FIG. 1 is a flowchart of a base-line method 20 of JPEG-compliant compression. Image data is first transformed using the DCT (Discrete Cosine Transform) (22), to generate a set of coefficients. These coefficients are then quantized (24). The quantized coefficients are then unfolded from a 8×8 representation to a 64×1 representation ("Zig-Zag", 26). These quantized coefficients are encoded using a variable-length encoding scheme (28), zero-run length encoded and then Huffman encoded (30), to reduce entropy. A compressed data file is then generated by prefixing the encoded data with header information (32). Other, similar, methods of JPEG compression are also known.

In accordance with a preferred embodiment of the invention, various of the above steps are performed using optical elements, rather than using electronic or software elements. In the above described JPEG compression method, the step that is typically most computationally demanding, is the DCT step. Thus, in a preferred embodiment of the invention, the DCT step is performed optically.

Figure 2:
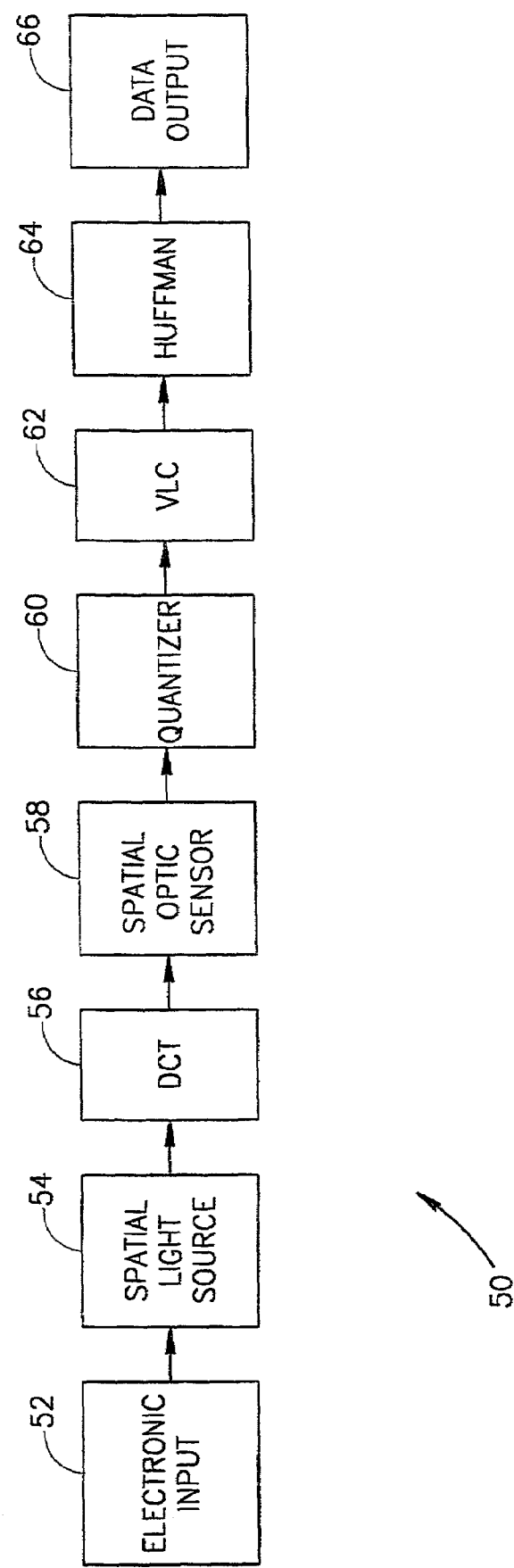
FIG. 2 is a schematic block diagram of an optical JPEG compression system, in accordance with a preferred embodiment of the invention.

FIG. 2 is a schematic block diagram of an optical JPEG compression system 50, in accordance with a preferred embodiment of the invention. An electronic input 52 is preferably used to receive the data to be compressed. This element will generally depend on the application for which system 50 is used. For example, if system 50 is implemented on a PC card, electronic input 52 will generally comprises a PC-compatible bus connector. The acquired data is then converted into light, using a spatial light source 54. In a preferred embodiment of the invention, light source 54 comprises an SLM (Spatial Light Modulator) which modulates a beam of light that is reflected from it or that is transmitted through it. Alternatively, source 54 may comprise an array of LEDs, laser diodes, VCELs (vertical cavity emission lasers) or other types of pixelated display devices such as CRT, field effect emitter arrays and plasma displays.

The type of light emitted by source 54 is preferably selected to match an optical DCT unit 56. In some preferred embodiments of the invention, the light from source 54 is coherent (so a laser source is preferably used). In other embodiments, the optics do not require coherent light. In a preferred embodiment of the invention, the light is preferably monochromatic. Alternatively, polychromatic light may be used. In some particular preferred embodiments of the invention, multiple frequencies of monochromatic light are used, for example wherein the frequencies are used to encode attributes of the data, such as its numerical sign. In a preferred embodiment of the invention, the data is encoded using an analog encoding scheme, for example phase or amplitude. Alternatively, a digital encoding scheme is used. Possibly, as described below, the light may be A/D converted from analog-encoding light into digital-encoding light, for example after it is transformed.

Optical DCT unit 56 transforms the light from an image space to a transform space. Preferably, the transformed light is projected unto a spatial optical sensor 58, such as a CCD array. Details of various types of DCT unit 56 and methods of construction thereof are provided below.

Data is read out of CCD array 58 and then it is quantized, using a quantizer 60. In a preferred embodiment of the invention, the quantization may be performed by setting gain and/or offset characteristic of the CCD and/or individual elements thereof and/or controlling the readout of the CCD, for example to provide a reduced bit-per-pixel ratio. Alternatively, the data is quantized as it is read off the CCD or after it is read off the CCD. Alternatively or additionally, the data is quantized by optical means, such as a second SLM in front of the CCD. The unfolding of the data may be performed before the quantizing or after the quantizing. Then, the data is encoded using a variable length encoding unit 62, Huffman-encoded using a Huffman encoding unit 64 and, finally, a header is attached to the compressed data so that it meets the JPEG standard. Alternatively or additionally, the data is encoded using arithmetic coding (preferably performed by an arithmetic coding unit—not shown).

As will be described below, additional elements of the compression system may be replaced with optical units. In some embodiments of the invention, the different optical units will be interconnected with electrical circuitry, for example for control, data management or data conversion. Thus, even if two consecutive units are embodied using optical means, they may have an intervening step of optical/electrical conversion and then electrical/optical conversion. In other embodiments, the processed light will feed directly from one optical unit to the next. In a preferred embodiment of the invention, a system includes both optical and electronic components and the processing is divided between the components so they can act in parallel. In one example, some of the transforming may be performed optically and some electronically. Such dividing up of work, can better utilize all the elements in a compression/decompression device, especially if some of the components are dual use, for example DSP components.

Optical DCT unit 56 may be implemented in various ways. It should be noted that when compressing images, the DCT transform applied is in actuality a block-DCT transform, where each part of the image is separately transformed.

Figure 3A:
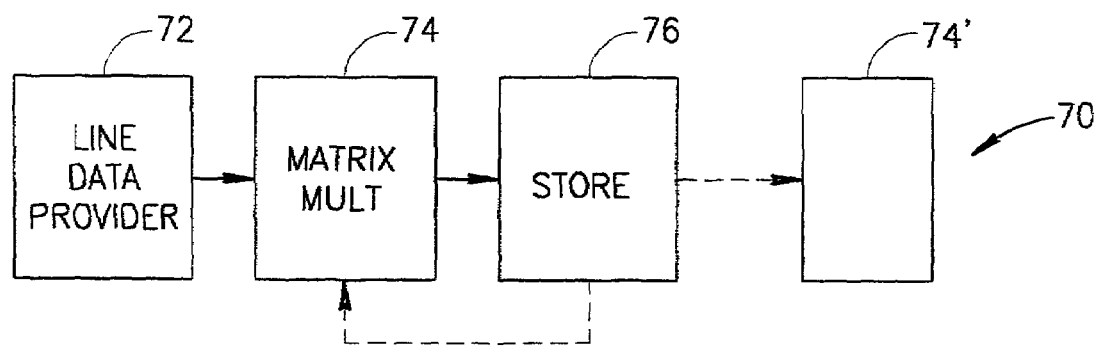
FIG. 3A is a schematic block diagram of a matrix-multiplication based optical DCT component, in accordance with a preferred embodiment of the invention.

FIG. 3A is a schematic block diagram of a matrix-multiplication based optical DCT component 70, in accordance with a preferred embodiment of the invention. The DCT transform can be presented in matrix form as [DCT]=[C][T][C]. Matrix by matrix multiplication may be performed in many ways, including using multiple repetitions of vector by matrix multiplication, for example as described in "Introduction to Fourier Optics", Goodman, pp. 286, or using direct matrix by matrix multiplication, for example as described in Feitelson, pp. 126–127 (double or triple products), preferably using monochromatic coherent light, or as described in Feitelson, pp. 118, using lenslet arrays, which can accommodate white light; the disclosure of all of which is incorporated herein by reference, In a vector by matrix embodiment of component 70, a line data provider 72 provides individual lines or columns of an 8×8 block to a matrix multiplier 74. The DCT transform of a vector can be performed by multiplying a source vector V by a convolution matrix C, to obtain a transformed vector T. For each 8×8 block the lines (or the columns) are individually transformed and then the result is transformed along the individual columns (or lines). In a preferred embodiment of the invention, the data is row transformed using a first unit 74 and is then column transformed using a second multiplication unit 74'. Alternatively, a same unit is used for both the row and column transforms. Preferably, the transformed row data is accumulated using a store unit 76. If each one of the rows is transformed in sequence, the transformed row data may be accumulated using store 76 even if a separate unit 74' is used for column transforms.

Figure 3B:
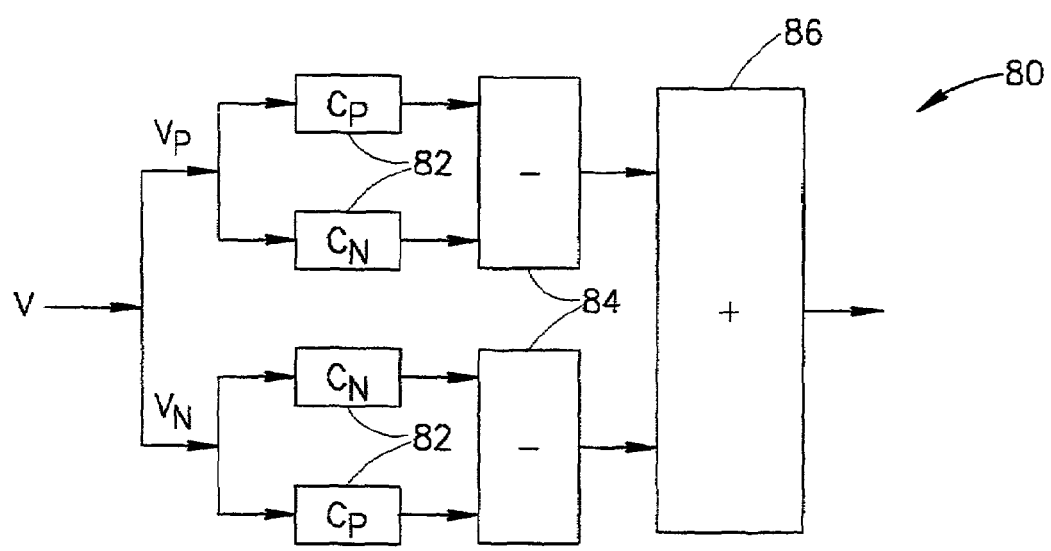
FIG. 3B is a schematic block diagram of an optical matrix by vector multiplication component, in accordance with a preferred embodiment of the invention.

FIG. 3B is a schematic block diagram of an optical matrix-by-vector multiplication component 80, in accordance with a preferred embodiment of the invention. When performing a DCT transform, negative-valued results may be produced. Multiplication component 80 separately processes negative- and positive-valued results, to avoid miss-processing. Mathematically, the multiplication of a matrix C by a vector V is a linear operation, so that it can be separated in to negative and positive components, e.g.: $C*V=Cp*Vp+Cn*Vn-Cp*Vn-Cn*Vp$, where the "n" subscript indicates negative numbers and the "p" subscript indicates positive numbers. In the component of FIG. 3B, vector V is separated into positive and negative values, which are each separately multiplied by positive or negative valued component matrixes 82 and then summed using subtractors 84 and an adder 86. In a preferred embodiment of the invention, four matrix multiplication units 82 are provided. Alternatively, only two or even only one unit 82 is used, for example to sequentially process negative and positive numbers. In general, the source data is all positive, so that the vector Vn is empty. It is noted that the DCT of the original image data, which is positive, may be simpler to implement than the DCT of transformed data, which may be negative.

In a preferred embodiment of the invention, sign issues are solved using a bipolar number representation. In a bipolar representation, each number is designated by two components: s=[p,n], where s is a general signed number (not necessarily an integer), and [p,n] are its positive and negative components. s is retrieved by setting s=p−n. Therefore, the number −5 can be described by [0,5], [3,8], [10,15], [1,6] or other combinations of p and n, as long as p, n>0, and p−n=s.

The generalized bipolar representation can be adapted to matrix calculation, by representing each number by a 2×2 matrix, of the form
[p n]
[n p].
For example:

$$\begin{bmatrix}1 & -2\\3 & -4\end{bmatrix}\cdot\begin{bmatrix}1 & -1\\2 & 2\end{bmatrix}=\begin{bmatrix}-3 & -5\\-5 & -11\end{bmatrix}\rightarrow\begin{bmatrix}1 & 0 & 0 & 2\\0 & 1 & 2 & 0\\3 & 0 & 0 & 4\\0 & 3 & 4 & 0\end{bmatrix}\cdot\begin{bmatrix}1 & 0 & 0 & 1\\0 & 1 & 1 & 0\\2 & 0 & 2 & 0\\0 & 2 & 0 & 2\end{bmatrix}=\begin{bmatrix}1 & 4 & 0 & 5\\4 & 1 & 5 & 0\\3 & 8 & 0 & 11\\8 & 3 & 11 & 0\end{bmatrix}$$

This representation can be extended to triple product matrix multiplication.

The [p,n] representation may be implemented using separate optical beams to represent each of the p and n components. Alternatively, a single, multi-characteristic beam may be used to represent both components. In one example, different optical frequencies are used for the different components. Alternatively or additionally, different polarizations are used for the different components. The two components may be separated out after processing, for example one component being diverted (or copied) to a different CCD. Alternatively, a single optical detector detects both components, for example a detector that is sensitive to the difference between the amplitudes in the two frequencies. Such a detector may be implemented by electronically subtracting the output of two adjacent detectors, each detector being sensitive to a different frequency.

Alternatively to the method of FIG. 3B, negative numbers may be dealt with in other ways. In one example, negative and positive numbers are differentiated by their phase. A diffraction grating can be used to divert numbers with one phase value to a different part of a CCD target (or other optical element) than those numbers with a second phase values. In another example, negative numbers are encoded using a different frequency than positive numbers. The different frequencies can be separated using suitable gratings or other optical elements. Alternatively or additionally, a self-electro-optical device may use one frequency in order to modulate the other frequency. Alternatively or additionally, a frequency sensitive CCD may be used, for example an RGB CCD. Alternatively or additionally, a CCD may be provided with binary phase or frequency detection, by providing a controllable polarizer or spectral filter before the CCD and timing its operation to the acquisition of positive or negative numbers.

Alternatively, negative numbers may be managed by biasing them to be positive, for example, by forcing the results of a DCT to be in the range [0 . . . 2] instead of [−1 . . . 1] (normalized values). In practice, if the maximum DC amplitude is A, the DCT results are shifted by +A, from the range [−A . . . A] to the range [0 . . . 2A]. In the example (described below) where a DCT is performed by mirroring the 8×8 datablock into a 16×16 datablock, a strong spatial delta pulse is provided in the middle of each 16×16 datablock, for example by controlling the SLM. The effects of this pulse (the bias) are preferably removed using electronic processing after the data is transformed.

Once the data is multiplied, further processing, such as sign extraction or as described below, can be achieved, for example, by performing optical A/D, and then binary operations or by using electronic components.

In the above description, a plurality of matrix-by-matrix or vector-by matrix operations are performed. The number of actually provided multiplication units depends on the implementation and especially on the level of parallelism of the implementation. For example, in one implementation, all the 8×8 blocks are processed in parallel. However, within each block, the multiplications may be performed in parallel (using a plurality of units if required) or in sequence (reusing a single unit for two operations, for example for row and for column DCT). Alternatively or additionally, two or more of the blocks may be processed in series, for example the two blocks sharing a single 8×8 multiplier. Such sequential processing generally requires electronic components, such as store 74, to read and store intermediate results and possibly also for summing up the individual results.

In a preferred embodiment of the invention, each matrix multiplication unit comprises a series of {SLM, lens, CCD} sub-systems which unit accepts electronic data at one end, converts it into optical signals, transforms the data using lens and then converts the transformed data into electronic signals again. Alternatively, a single SLM and/or a single CCD may be shared among several multipliers.

Figure 4A:
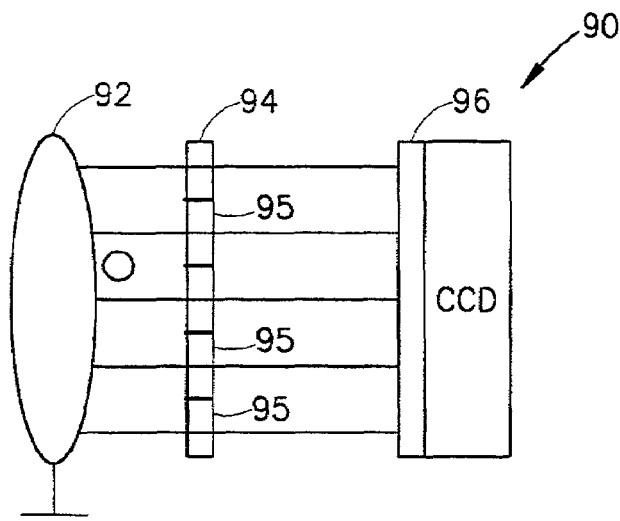
FIG. 4A is a schematic diagram of a lens-matrix based 2D DCT component, in accordance with a preferred embodiment of the invention.

FIG. 4A is a schematic diagram of a lens-matrix based 2D DCT component 90, in accordance with a preferred embodiment of the invention. Light from an image of an object 92 impinges on a lens-matrix 94. Array 94 preferably comprises a plurality of lens-elements 95, each of which performs a DCT on one 8×8 block of image 92. The result of the DCT is recorded by a CCD 96.

Figure 4B:
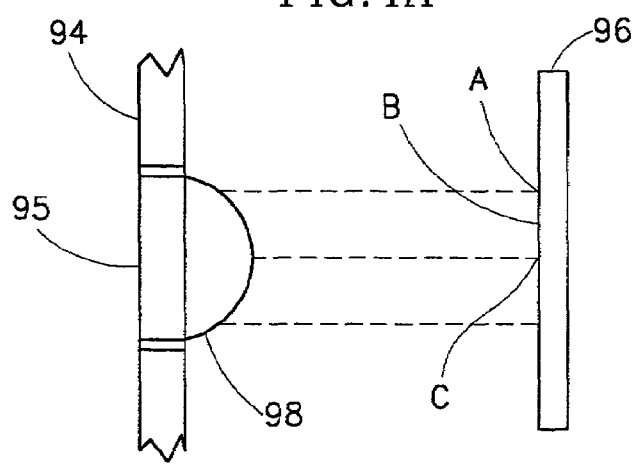
FIG. 4B is a schematic diagram of an optical element for the lens matrix of FIG. 4A.

FIG. 4B is a schematic diagram of a single optical element 98 suitable for the lens matrix of FIG. 4A, for performing a DCT. Optical element 95 is designed so that light emitted by different portions of the lens corresponds to different coefficients of the DCT transform of the impinging light. Thus, light corresponding to a first DCT coefficient is detected by CCD 96 at a point A. Light corresponding to a second DCT coefficient is detected at a point B. Typically, at least some of the light emitted by lens 95 does not correspond to a DCT coefficient, due to design considerations. Such light may be detected, for instance at a point C. The readout of CCD 96 is preferably configured to account for the correspondence between DCT coefficients and spatial locations on CCD 96. In a preferred embodiment of the invention, a plurality of or even all of optical elements 98 are combined into a single composite optical element. Alternatively, a single optical element 98 may be implemented as a sequence of individual optical elements.

Figure 4C:
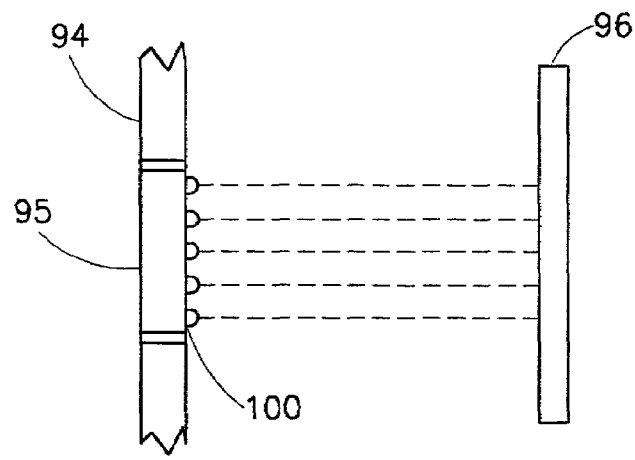
FIG. 4C is a schematic diagram of a lenslet array for the lens matrix of FIG. 4A.

FIG. 4C is a schematic diagram of a lenslet array 100 for the lens matrix of FIG. 4A, for performing a DCT. In a lenslet array, each individual lenslet preferably generates one DCT coefficient from the impinging light. In one exemplary embodiment, light from a 8×8 block of the image is received by 64 lenslets, preferably arranged in a 8×8 array. After each lenslet is a mask having opaque and transmissive portions and a CCD element is positioned opposite the mask to receive light which passes through the mask. In an exemplary embodiment, each lenslet creates an image of the image to be transformed. Each DCT coefficient d(k,l) is defined as:

$$d(k, l) = \sum_{1}^{N} \sum_{1}^{N} f(i, j) h(k, l; i, j) \tag{1}$$

where f is the input and h is the convolution definition. The opaque and transmissive portions of each of the (k,l) masks are defined to represent the values of h, in which the transmissiveness of mask elements for a lenslet (k,l) are defined to match the relative contribution of those image pixels (i,j) which take part in determining the (k,l) coefficient. The CCD element sums the light which passes through the mask, determining the DCT coefficient.

The Formula for a DCT transform and for an inverse DCT transform of an 8×8 block of image data f(x,y) and an 8×8 block of transform data F(u,v), are, respectively:

$$F(u, v) = \frac{1}{4} C(u) C(v) \sum_{x=0}^{7} \sum_{y=0}^{7} f(x, y) \cos\frac{(2x+1)u\pi}{16} \cos\frac{(2y+1)v\pi}{16}$$

$$f(x, y) = \frac{1}{4} \sum_{u=0}^{7} \sum_{v=0}^{7} C(u) C(v) F(u, v) \cos\frac{(2x+1)u\pi}{16} \cos\frac{(2y+1)v\pi}{16}$$

where C(u) and C(v) are $1/\sqrt{2}$ for u,v=0 and 1 otherwise.

In a preferred embodiment of the invention, a single large lenslet array is used to implement a matrix of individual lenslet arrays. In a preferred embodiment of the invention, the light from object 92 is focused onto lens matrix 94, so that all of the object is viewed by each one of the lens elements 95. Alternatively, only a block area of the light impinges on each lens element, for example by providing multiple side-by-side lens, each one viewing only a portion of object 92. Alternatively, where an SLM is used, the light which passes through the SLM can be formed of blocks of non-parallel light, so that block portions of the modulated light impinge each on a different lens element 95. Alternatively, especially where individual optical elements are used, the light from object 92 can be parallel light, so that each optical element receives parallel light from a single block area. In some cases, a lens element may receive light from more than one block area, for example for processing which is beyond the extent of a single block or to provide an overlap between blocks, for example to solve calibration problems.

Figure 4D:
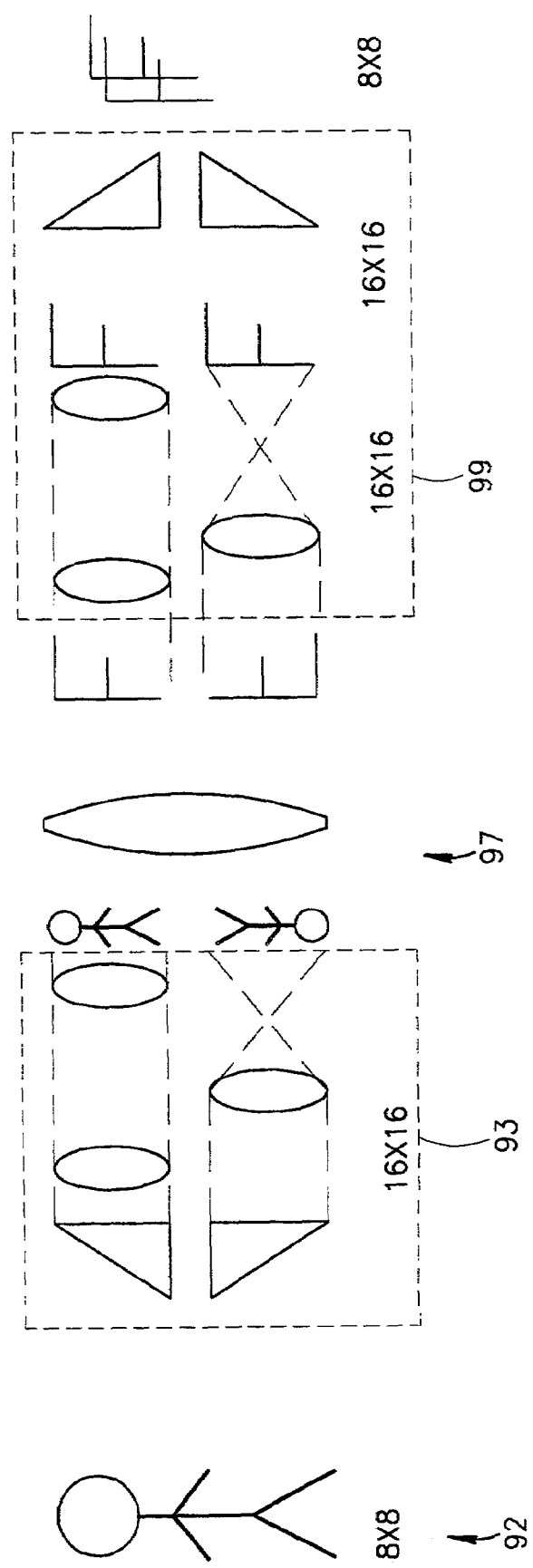
FIG. 4D is a schematic illustration of an optical system for performing a DCT transform using a Fourier lens.

FIG. 4D is a schematic illustration of an optical system for performing a DCT transform using a Fourier lens. Although in one preferred embodiment of the invention the lens-element directly performs a DCT, in an alternative preferred embodiment of the invention, a correspondence between Fourier transform and DCT is utilized to perform DCT (or other transforms) using a Fourier transform lens. Mathematically, a Fourier transform of real and symmetrical data results in only real (and symmetric) cosine coefficients. The image data to be compressed is typically real. It can be made symmetric by mirroring in the SLM. In order to achieve a discrete transform, the data is preferably provided as an impulse image, with each image portion being a spatial delta function, each of which pulses is transformed using a Fourier transform lens. This type of data provision can be achieved using an SLM with a pinhole filter. In multi-wavelength based embodiments, different pinholes may be designated for different wavelengths. Preferably both the SLM and the CCD are spatially matched according to the following formula: $\Delta \bar{x} = 0.5 \Delta x$, which defines the distances between the delta functions (pinholes) in the SLM and $$\Delta u = \frac{\lambda f}{2 \cdot \Delta x \cdot N},$$

which defines the distances between the delta-function receptor in the CCD (can also be modeled by providing a pinhole filter in front of the CCD. In these formula, $\Delta x$ and $\Delta u$ are the intervals between delta functions in the SLM and CCD respectively, f is the focal length, N is the block size and $\Delta \bar{x}$ is the placement of the delta function in the interval (phase shift) in the SLM. It can be seen that the pixels intervals in the CCD and the SLM are not necessarily the same, which may be implemented by ignoring some of the CCD pixels. An alternative matching condition is described below.

In the example of FIG. 4D, an 8×8 block of image 92 is made symmetric using a doubling and mirroring optical system 93 (alternatively to using an SLM) and then transformed by a Fourier lens 97. Since the data is mirrored in two dimensions (only one shown for clarity) a 8×8 block is transformed into a 16×16 block. The result is then combined using a combining optical system 99, to provide an 8×8 DCT transform. In some embodiments of the invention, optical system 93, lens 97 and optical system 99 are combined into a single optical element, thus, the end result is a single optical element which performs a DCT, suitable for use in lens-matrix 94. A matrix of such optical elements may be combined to form a single optical element which performs a block DCT transform. Alternatively to the optical systems shown, other constructions can be utilized for mirroring, doubling and combining. In one example, an image block is first doubled and arranged as a 2×2 matrix of blocks and then individual blocks of the 2×2 matrix are flipped, to provide the symmetry required for the DCT transform (or other type of transform).

The correspondence between Fourier transform and DCT can also be utilized for other optical transform architectures, for example the matrix-vector multiplication method described above. In another example, a wavelet transform can be performed by mirroring data to be anti-symmetric instead of symmetric, as in the DCT case.

The above matching condition may be derived using the following analysis (for a one dimensional case). The following equation defines the JPEG-DCT which is to be achieved:

$$F(k) = \sum_{n=0}^{N-1=7} f(n) \cdot \cos\left(\frac{\pi k (2n+1)}{2N}\right) \quad (2)$$

Assuming symmetric input, where every block of 16 samples is represented as a combination of delta functions, spaced at intervals of size $\Delta x$, and transmitted from a $\Delta \bar{x}$ position inside each interval:

$$s(x) = \sum_{n=0}^{N-1=7} f(n) \cdot \delta(x - n \cdot \Delta x - \Delta \bar{x}) + \sum_{n=0}^{N-1=7} f(n) \cdot \delta(x + n \cdot \Delta x + \Delta \bar{x}) \quad (3)$$

Applying the optical Fourier transform:

$$\tilde{s}(u) = \int_{-\infty}^{\infty} s(x) \cdot e^{-j\frac{2\pi u x}{\lambda f}} dx \quad (4)$$

The imaginary parts cancel out (due to the input being symmetric):

$$\tilde{s}(u) = \sum_{n=0}^{N-1=7} f(n) \cdot \cos\left(\frac{2\pi u \cdot (n \cdot \Delta x + \Delta \bar{x})}{\lambda f}\right) \quad (5)$$

Assuming accurate sampling at the Fourier plane (the CCD):

$$\tilde{s}(k) = \sum_{n=0}^{N-1=7} f(n) \cdot \cos\left(\frac{2\pi \cdot k \cdot \Delta u \cdot (n \cdot \Delta x + \Delta \bar{x})}{\lambda f}\right) \quad (6)$$

Since equation (2) is desired, we match:

$$\tilde{s}(k) = \sum_{n=0}^{N-1=7} f(n) \cdot \cos\left(\frac{2\pi \cdot k \cdot \Delta u \cdot (n \cdot \Delta x + \Delta \bar{x})}{\lambda f}\right) \quad (7)$$

$$= \sum_{n=0}^{N-1=7} f(n) \cdot \cos\left(\frac{\pi k (2n+1)}{2N}\right)$$

Thus, one matching condition is:

$$\cos\left(\frac{2\pi \cdot k \cdot \Delta u \cdot (n \cdot \Delta x + \Delta \bar{x})}{\lambda f}\right) = \cos\left(\frac{\pi k(2n+1)}{2N}\right) \quad (8)$$

Leading to:

$$\frac{\Delta u \cdot \Delta x}{\lambda f} = \frac{1}{2N} \quad (9)$$

and $$\frac{2 \cdot \Delta u \cdot \Delta \bar{x}}{\lambda f} = \frac{1}{2N} \quad (10)$$

resulting in the above matching condition:

$$\begin{cases} \Delta \bar{x} = 0.5 \cdot \Delta x \\ \Delta u = \frac{\lambda f}{2\Delta x \cdot N} \end{cases} \quad (11)$$

In some cases, it may be not be suitable to provide delta functions (pinholes or other optical elements) on one or both of the SLM and CCD. The following analysis shows a method of matching a CCD and an SLM, by spatially modulating the light in a less drastic manner, for example using continuous neutral density filters.

The following equation describes an SLM-like object:

$$s(x) = \sum_{n=0}^{N-1=7} f(n) \cdot l(x - n \cdot \Delta x) + \sum_{n=0}^{N-1=7} f(n) \cdot l(x + n \cdot \Delta x) \quad (12)$$

Where l(x) is a general transmission function of the SLM, assumed identical for all pixels, and symmetric, so it can be mirrored. However, it should be noted that a similar but more complex analysis can also be performed in the case where not all the pixels are identical.

After applying the optical (and continuous) Fourier transform:

$$\tilde{s}(u) = \sum_{n=0}^{N-1=7} f(n) \cdot L(u) \cdot \cos\left(\frac{2\pi u \cdot n \cdot \Delta x}{\lambda f}\right) \quad (13)$$

Where L(u) is the Fourier transform of l(x). Since the actual sampling is done by summing all intensities on a detector cell (i.e., a CCD pixel cell), equation (5) transforms to:

$$\tilde{s}(k) = \frac{1}{\Delta u} \int_{k \cdot \Delta u - \Delta \bar{u}/2}^{k \cdot \Delta u + \Delta \bar{u}/2} \tilde{s}(u) \cdot W(u) \, du \quad (14)$$

Where W(u) is the CCD detection weight function. Again, it is assumed that W is the same for all pixels but this assumption is not required. Using equation (13):

$$\tilde{s}(k) = \frac{1}{\Delta u} \int_{k \cdot \Delta u - \Delta \bar{u}/2}^{k \cdot \Delta u + \Delta \bar{u}/2} W(u) \cdot \left\{ \sum_{n=0}^{N-1=7} f(n) \cdot L(u) \cdot \cos\left(\frac{2\pi \cdot n \cdot \Delta x}{\lambda f}\right) \right\} \cdot du \quad (15)$$

Since equation (2) is desired, we match:

$$\cos\left(\frac{\pi k(2n+1)}{2N}\right) = \frac{1}{\Delta u} \int_{k \cdot \Delta u - \Delta \bar{u}/2}^{k \cdot \Delta u + \Delta \bar{u}/2} W(u) \cdot L(u) \cdot \cos\left(\frac{2\pi \cdot n \cdot \Delta x}{\lambda f}\right) \cdot du \quad (16)$$

We define:

$$R(u) \equiv W(u) \cdot L(u)/\Delta u \quad (17)$$

The matching requirement is thus:

$$\cos\left(\frac{\pi k(2n+1)}{2N}\right) = \int_{k \cdot \Delta u - \Delta \bar{u}/2}^{k \cdot \Delta u + \Delta \bar{u}/2} R(u) \cdot \cos\left(\frac{2\pi \cdot n \cdot \Delta x}{\lambda f}\right) \cdot du, \quad (18)$$

$$n, k = 0, \ldots N-1$$

Which results in the following N×N Fredholm I equations (for the 1D case. In 2D its N×N×N>N equations):

$$\begin{cases} k = 0, n = 0: \\ 1 = \int_{-\Delta \bar{u}/2}^{\Delta \bar{u}/2} R(u) \, du \\ k = 0, n = 1: \\ 1 = \int_{-\Delta \bar{u}/2}^{\Delta \bar{u}/2} R(u) \cos\left(\frac{2\pi \cdot \Delta x \cdot u}{\lambda f}\right) du \\ \ldots \\ k = 1, n = 0: \\ \cos\left(\frac{\pi}{2N}\right) = \int_{\Delta u - \Delta \bar{u}/2}^{\Delta u + \Delta \bar{u}/2} R(u) \, du \\ k = 1, n = 1: \\ \cos\left(\frac{3\pi}{2N}\right) = \int_{\Delta u - \Delta \bar{u}/2}^{\Delta u + \Delta \bar{u}/2} R(u) \cos\left(\frac{2\pi \cdot \Delta x \cdot u}{\lambda f}\right) du \\ \ldots \end{cases} \quad (19)$$

Equation set (19) defines a Fourier coefficients solution to the problem of describing R(u) by cosine series, i.e., $$R(u)|_k = \sum_{n=0}^{N-1=7} \cos\left(\frac{\pi k(2n+1)}{2N}\right) \cdot \cos\left(\frac{2\pi \cdot u \cdot n \cdot \Delta x}{\lambda f}\right) \quad (20)$$

This solution preferably defines a matching between individual pixels in the SLM (u) and the CCD (k). $u \in [k \cdot \Delta u - \Delta \bar{u}/2, k \cdot \Delta u + \Delta \bar{u}/2]$.

It should be noted that equation 20 actually defines a family of solutions, thus, in some embodiments of the invention, standard geometries of SLMs and CCDs are used, while in others one or both of the SLM and CCD are modified to better fit a particular matching solution. In the general case, the matching may be performed by using neutral filters and by matching at least the locations, if not the sizes of CCD and SLM pixels.

In a preferred embodiment of the invention, the above matching condition(s) are applied towards other discrete linear transforms which are to be applied using Fourier lens:

$$F(k) = \sum_{n=0}^{N-1} f(n) \cdot C(k, n) \quad (21)$$

Applying the same procedure, as in equations (12)–(20), (18) now reads:

$$C(k, n) = \int_{k \cdot \Delta \bar{u} - \Delta \bar{u}/2}^{k \cdot \Delta \bar{u} + \Delta \bar{u}/2} R(u) \cdot \cos\left(\frac{2\pi \cdot n \cdot \Delta x}{\lambda f}\right) \cdot du, \quad (22)$$

$$n, k = 0, 1, \ldots N - 1$$

So for the general 1D linear transform:

$$R(u)|_k = \sum_{n=0}^{N-1} C(k, n) \cdot \cos\left(\frac{2\pi \cdot u \cdot n \cdot \Delta x}{\lambda f}\right), \quad (23)$$

$$u|_k \in [k \Delta \bar{u} - \Delta \bar{u}/2, k \Delta \bar{u} + \Delta \bar{u}/2]$$

or the matching condition of equation (11) can be used. In the context of matching conditions it should be noted that a matrix arrangement of sub-elements is not required. Rather, it is sufficient that there be a correspondence between the pixels in the SLM and the pixels in the CCD. A simple construction is that of a matrix of elements.

The use of the above matching condition may depend on the type of detector used. A standard CCD detector measures power (amplitude squared). Thus, a square root of the measurement may need to be determined. Additionally, some types of processing require the sign of the result, or even its phase. Various methods of determining a sign of the result are described above. A related issue is that a CCD detector integrates the square of the amplitude, so when even after taking a square root the result is not precise. However, in many cases the effect of the error is negligible and usually smaller than that allowed by the JPEG standard. This error is especially small if most of the CCD area (for each pixel) is ignored. Ignoring most of the CCD area is also useful in that it reduces noise, albeit usually requiring more signal strength.

Alternatively, an amplitude (rather than power) detector is used, for example using a detector with a gamma of 0.5. Alternatively or additionally, a phase detector is used to determine the sign. One possible implementation of a phase detector is to supply a polarized reference beam that can be compared to the detected beam, for example using inference effects.

In an alternative preferred embodiment of the invention, DCT, FFT or block transforms are achieved using a holographic lens, for example replacing lens-matrix 94, individual lens-elements 95 and/or other optical elements (described below). Alternatively or additionally, two dimensional holograms may be used, for example, by providing arrays of phase and amplitude modifying materials, instead of refracting elements. Alternatively or additionally, a look-up-table based approach to transforming may be used, for example using the look-up table methods described in U.S. Pat. No. 4,892,370, the disclosure of which is incorporated herein by reference. Alternatively or additionally, acousto-optical type optical elements are used. An advantage of transform-lens, such as described with reference to FIGS. 4A–4D, is that they are better matched to the physical model of the compression, i.e., transforming data from an image space into a transform space. Holograms are a general purpose optical element design method, which although they are very flexible, may have an efficiency penalty. Look-up tables are general purpose solutions which may require a larger and/or more complex optical architecture than a matched architecture such as a lenslet array.

Figure 5A:
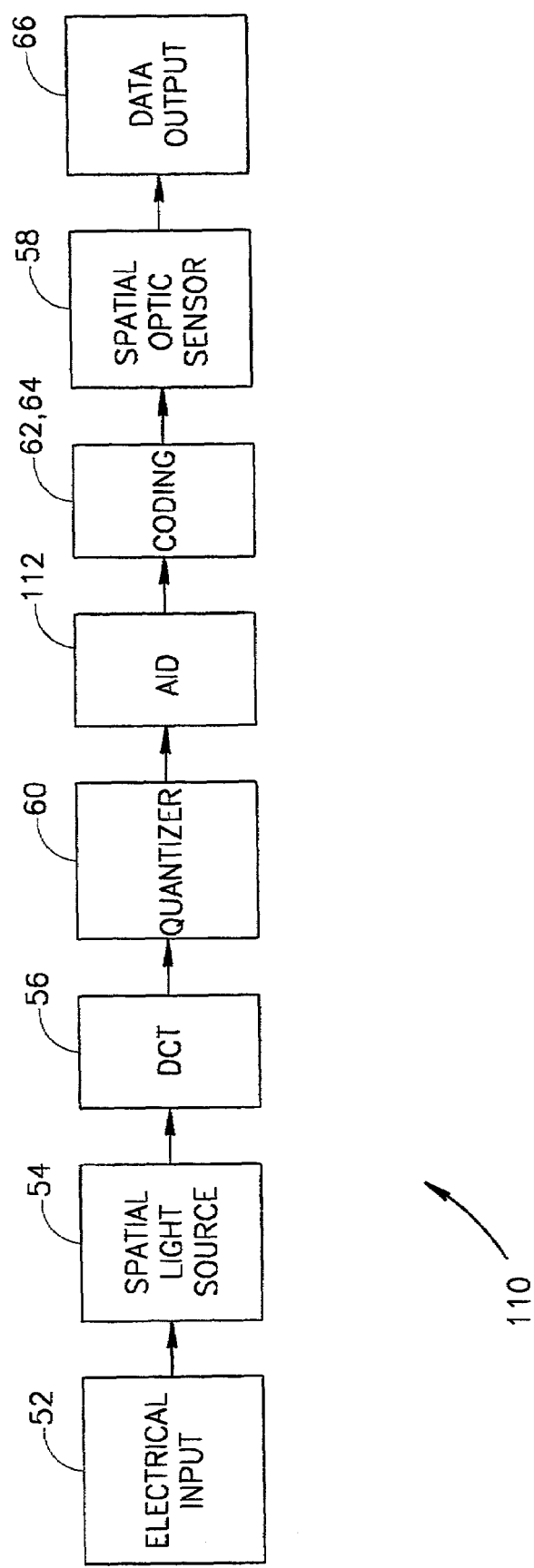
FIG. 5A is a schematic block diagram of an optical JPEG compression system, in accordance with another preferred embodiment of the invention.

FIG. 5A is a schematic block diagram of an optical JPEG compression system 110, in accordance with another preferred embodiment of the invention, in which the DCT transformed data is further processed prior to being converted to electrical signals. A main difference from the embodiment of FIG. 2 is the provision of an A/D converter 112, which converts the data from an analog representation to a digital representation. Thus, coding (e.g., VLC and Huffman) can be performed optically using various types of available hardware architectures. The Zig-Zag step (26) may be performed before or after quantization, for example, even after the data is converted to electrical signals, by optical sensor 58. An exemplary optical A/D converter is described in "Real-Time Parallel Optical Analog-to-Digital Conversion", by A. Armand, A. A. Sawchuk, T. C. Strand, D. Boswell and B. H. Soffer, in *Optics Letters*, Vol. 5 No. 3, March 1980, the disclosure of which is incorporated herein by reference.

In the embodiment of FIG. 5A, quantization is shown as being performed on the optical data, for example utilizing an SLM or a controllable attenuator such as an LCA with one or more face polarizers which selectively "divide" DCT coefficients by a weight. Alternatively, the data is quantized after the A/D conversion, for example using a suitable lookup table or a holographic lens. In embodiments where digital data is represented by spatial bit patterns, as in the above paper ("real-time"), quantizing may be performed by spatially blocking out certain bits. In embodiments where digital data is represented temporally, temporal filtering may be used in which certain pixels are darkened, in synchrony to the bit order of the light pattern, so that those bits are blocked out. It is noted that the quantization step and the encoding step (at least the VLC) may be combined as a single step, using relatively standard tables, as known in the art of electronic JPEG.

In some embodiments of the invention, it is desirable to achieve different spatial and/or bit resolutions for different parts of the image. In one example, the CCD can be read out at varying resolutions, responsive to the desired spatial resolution. In another example the light source is defocused for portions where a lower resolution is required. Alternatively or additionally, the quantization is varied between the blocks. If for example quantization is achieved by selective blocking of pixels, this blocking may be implemented using an electrically controllable spatial filter, for example an LCD, which can be set to the desired quantization.

In a preferred embodiment of the invention it is desirable to simultaneously generate multiple resolutions of JPEG data. In a preferred embodiment of the invention, this is achieved by parallel application of the JPEG algorithm, using hardware as described herein. Alternatively, this may be achieved (for example in the embodiment of FIG. 2) by reading out the CCD at different resolutions, for different JPEG resolution levels. Alternatively, varying resolutions may be achieved by zooming the source image 92 up or down, for example using a zooming lens or by suitable control of an SLM which generates the light.

Compression of color images may be achieved by converting the image from an RGB format into a YUV format (if it is not already so represented) and then compressing each of the Y, U and V components. Typically, only the Y component is compressed at a full spatial resolution, while the U and V components are compressed at half their spatial resolution. In one preferred embodiment of the invention, different hardware is provided for the different components. Alternatively, the same hardware is used, sequentially. Alternatively, other color component separation methods may be used.

In a preferred embodiment of the invention, an image sequence, such as a video sequence is compressed utilizing the above methodology. In a preferred embodiment of the invention, each of the images in the sequence sequences is compressed in turn using the above method of JPEG compression, providing a series of JPEG compressed images. In a preferred embodiment of the invention, inter-frame compression is achieved by motion estimation for example using adaptive differential coding by subtracting consecutive images. In a preferred embodiment of the invention, consecutive images are subtracted using an SLM which is driven with a previous image's density distribution. In a self-electro-optic effect device, the SLM can be programmed directly using the previous image, without requiring external electronics to store or otherwise manipulate the image.

In some configurations, especially those using lower quality optics, light from one group of pixels (i.e., an 8×8 block) pixel may spill into an adjacent group, adding noise to the processing process. In some cases, but not typically, even leakage between two adjacent pixels is a problem. In some preferred embodiments of the invention, this issue is tackled by separating light in adjacent channels (pixels), so as to reduce the probability, degree and/or intensity of overlap.

In some preferred embodiments of the invention, the separation is achieved using spatial separation. In one preferred embodiment of the invention, a light absorbing material is provided between adjacent groups or pixels (e.g., on SLM, CDD or in optical path between them).

Figure 5B:
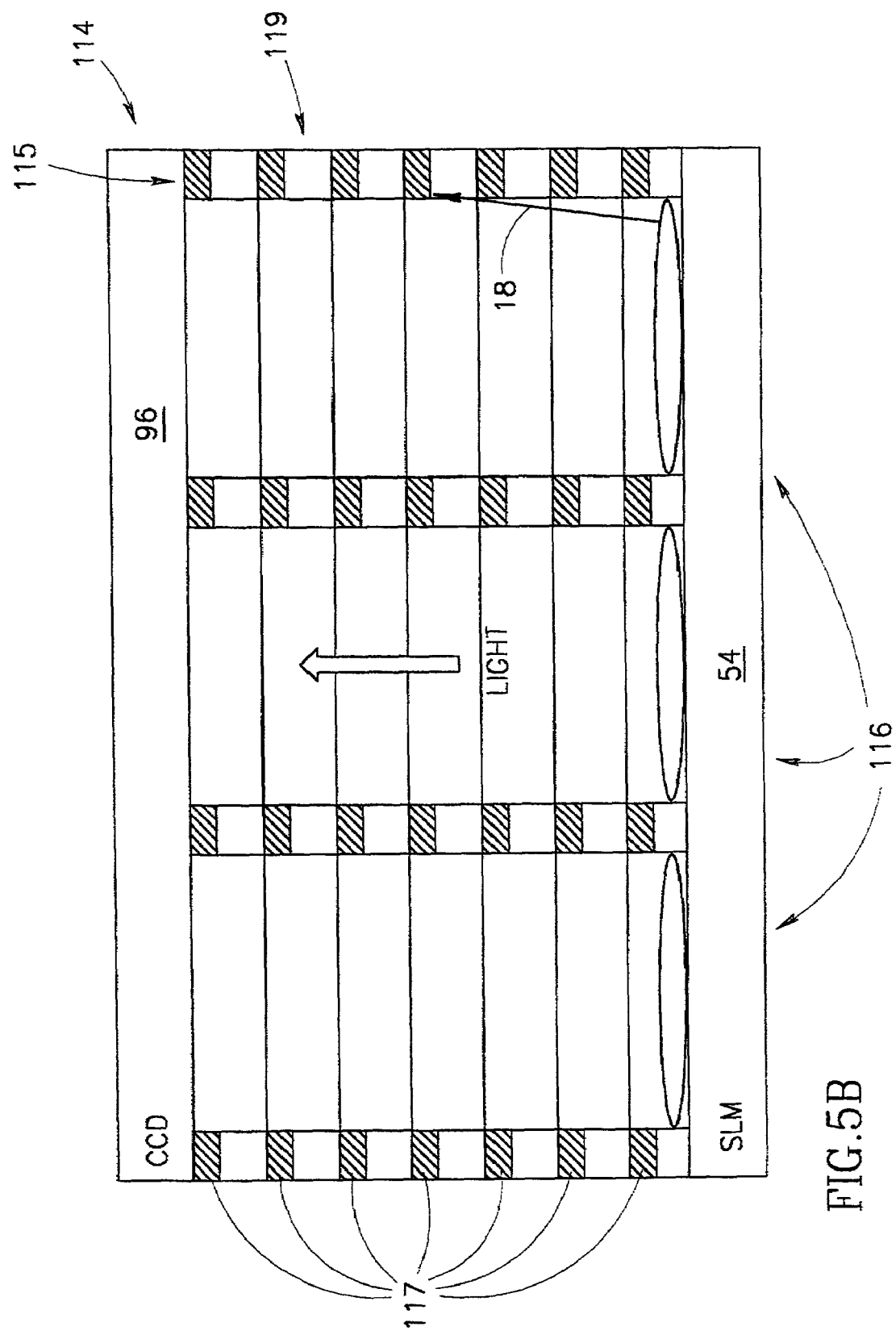
FIG. 5B is a schematic cross-section of a channel separation method in accordance with a preferred embodiment of the invention.

FIG. 5B is a schematic cross-section of a channel separation method in accordance with a preferred embodiment of the invention. A device 114 comprises a plurality of channels 116. The channels are separated by absorbing columns 115. In one embodiment of the invention (not shown) the columns are solid. However, light may reflect off the side of such a solid column. Thus, in a preferred embodiment of the invention, each of columns 115 comprises a plurality of spaced apart absorbing portions 117. When a near parallel ray of light hits such a portion (as shown by arrow 118) the ray is likely to hit the absorbing material at a near perpendicular angle, assuring a high absorption. In one particular implementation, a plurality of layers 119 are provided, each layer having at least one absorbing portion 117 defined thereon. Layers 119 are stacked to achieve the configuration shown in FIG. 5B. portions 117 may be the thickness of a layer, in which cases the layers are preferably arranged so that portions 117 of two contiguous layers are not aligned. Alternatively, portions 117 are shallow. In some embodiments, a generous spacing between portions 117 is provided, so that light will be less likely to be reflected off the sides of portions 117. Alternatively or additionally to spacing, portions 117 may have a sawtooth pattern defined thereon which has a face substantially perpendicular to light rays 118. Although absorbing portions 117 are shown to have a face perpendicular to main path of the light, other angles may also be used advantageously, for example to provide faces which are perpendicular to off-axis light rays, such as light ray 118.

Alternatively to light absorbing material, beam forming elements may be provided to maintain the light beams in paths corresponding to their individual channels. Alternatively or additionally, light from adjacent groups or pixels may be separated using divergent optics, so that there is dead space between the individual beams. Alternatively or additionally, inactive CCD or SLM elements may be used so that the pixels are generated and/or detected in spatial separation. Alternatively or additionally, non-square pixels are used, for example circular pixels, so that there is less contact between adjacent pixels. Alternatively or additionally, the pixel groups are mapped onto non-square regions, for example circles, to minimize overlap.

Alternatively or additionally to spatial separation, temporal separation may be practiced. In one example, the image plane is separated into two or more sets of pixels such that there is spatial separation between pixels (or specific groups thereof) of each plane, within the plane. Then the two planes are processed at a relative temporal delay, to reduce inter-pixel interactions. The separation may be achieved, for example at the SLM or at the detector.

Alternatively or additionally, frequency separation may be practiced, with adjacent pixels or other pixels in danger of overlap having different wavelengths of light.

Alternatively or additionally, polarization frequency may be practiced, for example adjacent pixels using light polarized at 90° relative to each other. Preferably, each pixel utilizes two polarizers, one when it is generated (or later in the optical path) and one when it is detected (or earlier in the optical path). Possibly, source polarization is provided by the SLM, in addition to or instead of a separate polarizer.

In the above separation methods, different configurations may be used based on the expected degree of leakage of light. For example, in a simplest case, the separation is in a checkerboard pattern having alternating "black" and "white" pixels, with the "black" pixels (or pixel groups) being one channel type (e.g., polarization angle, frequency, time delay), and the "white" pixels having a second value. Alternatively more than two channels are used, for example if leakage of a pixel to a distance of more than one pixel is expected. In the example of polarization, the relative angle may be selected to be 70°, rather than 90°.

Figure 6:
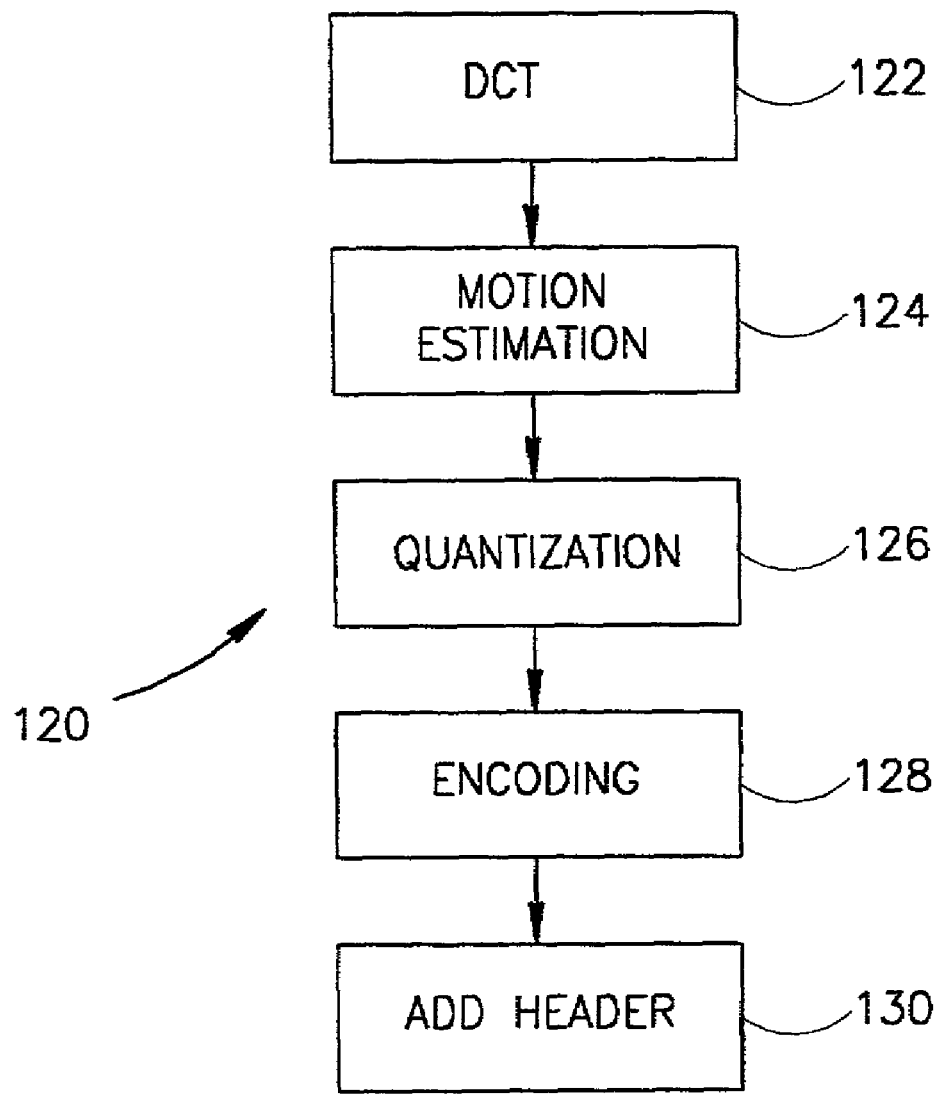
FIG. 6 is a schematic flowchart of a base-line method of MPEG-compliant compression.

FIG. 6 is a simplified schematic flowchart of a base-line method 120 of MPEG-compliant compression, which flowchart does not show various feedback loops often utilized in the MPEG compression method. One of the main advantages of the MPEG compression method over the JPEG compression method is that the MPEG method takes into account similarities between consecutive images. One of the main tools for similarity determination is motion estimation, in which the motion of portions of the image are determined, so that an image can be reconstructed from spatially translated parts of previous images. Transmitting only the amount of translation usually requires less bandwidth than transmitting coefficients for an entire block. Thus, in an exemplary method, input data is transformed using a DCT transform (122). Motion estimation is performed (124). The resulting coefficients of translation data is quantized (126), encoded (128) and combined with a header (130) to form a data stream.

In a preferred embodiment of the invention, alternatively or additionally to performing the DCT step using optical processing methods, also the motion estimation is performed using optical processing. In a preferred embodiment of the invention, motion estimation is performed by performing an autocorrelation of the source data with itself, allowing small amounts of block motion, using well known optical means, to determine block motion. Alternatively however, a DCT based motion estimation scheme is used. Thus, a same or similar hardware as used for the DCT may also be used for at least part of the motion estimation. A method of motion estimation using DCT is described in a Ph.D. Dissertation titled "Low Complexity and High Throughput Fully DCT-Based Motion Compensated Video Coders", by Ut-Va Koc, presented in 1996 to K. J. Ray Liu of the institute for systems research and sponsored by the National Science Foundation Engineering Research Center Program, the University of Maryland, Harvard University and Industry, in U. V. Koc and K. J. R. Liu, "Low-Complexity Motion Estimation Techniques", U.S. Pat. No. 5,790,686, issued Aug. 4, 1998 and in U. V. Koc and K. J. R. Liu, "DCT-Based Motion Estimation", IEEE Trans. on Image Processing, Vol. 7, No. 7, pp. 948–965, July, 1998, the disclosures of which are incorporated herein by reference. The method described therein can be summarized as follows (based on table 4.2 in the Ph.D. dissertation), with the DCT portions preferably being performed as described herein. Preferably, other elements of the process are also implemented using optical components, for example peak finding.

a. Compute the 2D DCT coefficients of second kind (2D-DCT-II) of an N×N block of pixels at the current frame t, $\{x_t(m,n); m,n \in \{0, \ldots, N-1\}\}$.

b. Convert stored 2D-DCT-II coefficients of the corresponding N×N block of pixels at the previous frame t−1, $\{x_{t-1}(m,n); m,n \in \{0, \ldots, N-1\}\}$ into 2D DCT coefficients of first kind (2D-DCT-I) through a simple rotation unit T.

c. Find the pseudo phases $\{g^{CS}(k,l); k=0,1, \ldots, N-1; l=1, 2, \ldots, N\}$ and $\{g^{SC}(k,l); k=1,2, \ldots, N; l=0,1, \ldots, N-1\}$, which are calculated from the DCT coefficients independently at each spectral location.

d. Determine the normalized pseudo phases f(k,l) and g(k,l) from $g^{CS}$ and $g^{SC}$ by setting ill-formed pseudo phases to zero.

e. obtain the inverse DCT (2D-IDCT-II) of f(k,l) and g(k,l) as DCS(m,n) and DSC(m,n) for $m,n \in \{0, \ldots, N-1\}$ respectively.

f. Find peaks in DSC and DCS, which peak positions represent the shift amounts and peak signs represent the direction of movement.

g. Estimate the displacement from the signs and positions of the found peaks.

It is noted that even in this method of motion estimation, some processing is required beyond the DCT, however, a significant portion of the computation may be dealt with by DCT or IDCT transforming of the data (in parallel or in sequence for each block). In a preferred embodiment of the invention, the previous image and/or its DCT coefficients are stored and/or provided using suitable electronics. Possibly, the optical DCT transforming elements are used for performing DCT and IDCT. Alternatively to the above method of motion estimation, direct correlation of image blocks may be used to estimate motion, for example, using image correlation optical systems known in the art as part of the compression process.

The above description has centered on compression, however, it should be noted, that decompression is very similar to compression and can often utilize similar or the same hardware. In the example of JPEG, DCT (for compression) and inverse DCT (for decompression) can be performed using a same optical transform element. In the example of MPEG, motion compensation, i.e., recreating images by compensating for the effect of motion, which motion was determined using motion estimation, can utilize a similar DCT-based method, also described in the above doctorate. It is noted that for some decompression methods, there is a requirement for some processing before the transforming of coefficients into an image domain. For example, in JPEG de-compression, the compressed image data is un-runlength encoded and de-quantized prior to being IDCTed. As with compression, these processing steps may be performed optically and/or electronically, depending on the implementation.

Figure 7A:
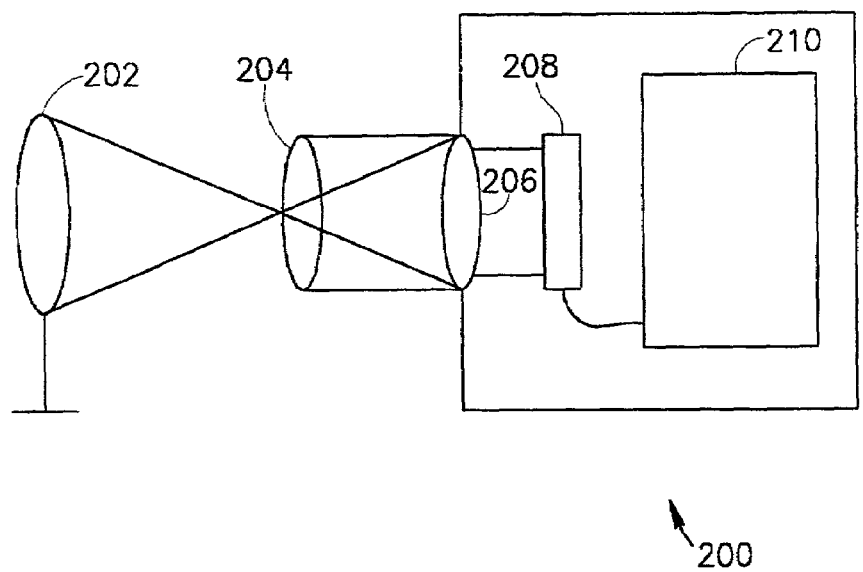
FIG. 7A is a schematic diagram of a direct-compression camera system, in accordance with a preferred embodiment of the invention.

FIG. 7A is a schematic diagram of a direct-compression camera system 200, in accordance with a preferred embodiment of the invention. In system 200, an image of a real object 202 is acquired directly as transformed and/or compressed data, rather than being acquired as image data which is later compressed. There are many applications in which an image is acquired in order to be stored on a digital media or in order to be transmitted over bandwidth-limited transmission lines. Examples of such applications include digital cameras, security cameras, teleconferencing systems, live-feed TV cameras and video-telephones. In a preferred embodiment of the invention, the data is acquired in a compressed manner, using the above described methods of compressing optical data, except that it is preferably the original optical waves, arriving from the object, that are compressed, rather than an electronic representation which is separately acquired and compressed.

In the exemplary system of FIG. 7A, an optional object lens 204 focuses and directs the light form object 202 onto a DCT lens (or lens matrix) 206. Lens 206 may also comprise other optical elements which perform further steps of the image compression method. The processed light is collected by a CCD 208 and then further processed and stored in a storage 210. In real-time embodiments, the acquired data may be transmitted, instead of or in addition to storage. The compression method performed may be a method suitable for still images, such as JPEG or a method suitable for moving images.

In a preferred embodiment of the invention, DCT lens 206 is designed to operate on white light. Alternatively, the light arriving from the scene is filtered so that it is monochrome. Alternatively or additionally, the image is acquired under controlled lighting situations, so that the light has known characteristics, such as being coherent, monochromatic or formed of a small number of narrow spectral bands. Alternatively or additionally, the image is acquired using a monochromatic light, possible a laser flash, so that the characteristics of the light are controlled by system 200. Such controlled lighting is especially useful for low-light level cameras, such as those using GICCD (Gated Intensified CCD) technology. Also, the use of coherent light simplifies the use of hologram-based image processing techniques.

Alternatively or additionally to an objective lens 204, a light encoding module, such as a combination CCD/SLM may be used, to convert incoming light into light having desired spatial and spectral characteristics. Alternatively or additionally, a self-electro-optical effect shutter is used, in which the impinging light is used to modulate the transmission of last or other controlled light.

Figure 7B:
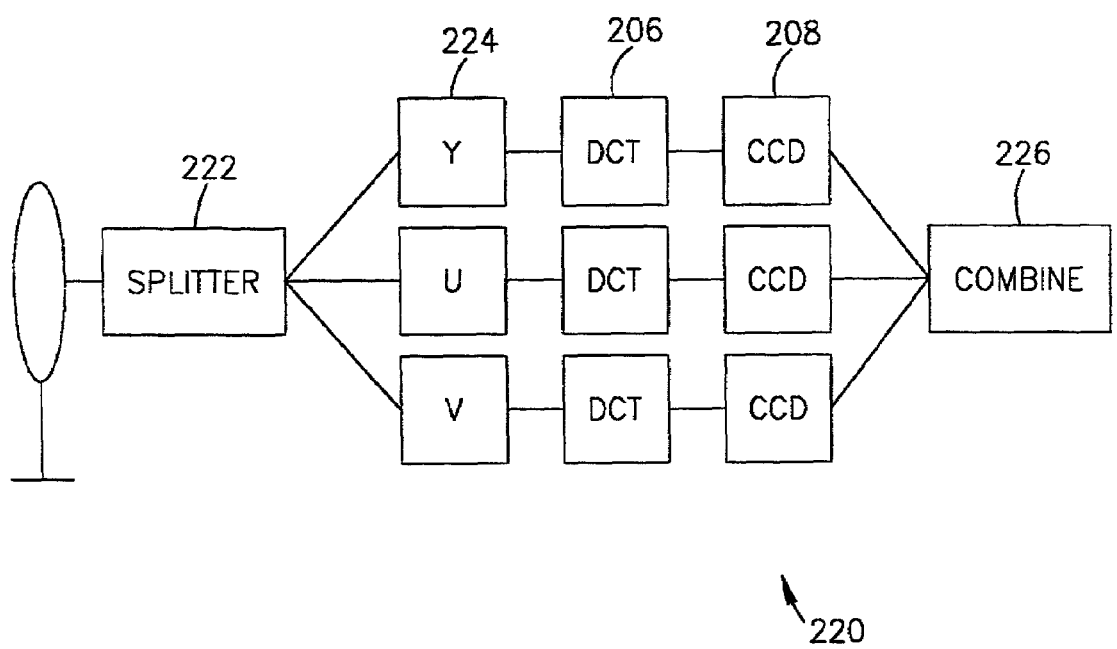
FIG. 7B is a schematic block diagram of a YUV-separated implementation of the embodiment of FIG. 7A.

FIG. 7B is a schematic block diagram of a YUV-separated implementation 220 of the embodiment of FIG. 7A. Color images may be compressed by separately compressing each color component, or more commonly, each of the YUV components. These components may be determined using a look-up table or by simple arithmetic on the R, G and B components of an incoming image. These separations may be performed using optical means and/or electronic means, shown generally as a splitter 222. Each of the resulting color components (224) is then processed separately, using a dedicated DCT 206 and a dedicated CCD 208. The results are then added using a combiner 226. It should be noted that the U component and the V component are usually processed at a lower resolution than the Y component. Thus, the U and the V can share optical components. Alternatively or additionally, all three components are processed using a single optical path, for example on different parts of a same lens-CCD set. Alternatively or additionally, the three components are processed sequentially.

A component which performs image compression or decompression may be packed in various ways, depending on the application. In one application, a PC graphics card includes an optical processor for aiding in displaying MPEG images. In another example, a CCD camera includes an MPEG or a JPEG optical module so that they can provide a compressed data output as well as a standard data output.

In a preferred embodiment of the invention, the above described optical elements are provided embedded in a transparent substrate, such as a clear plastic or glass, so that once the elements are coupled, there is no relative movement due to vibration, heat or other external forces. It should be noted that pixel-sized transverse shifts in the optical elements do not substantially affect the output, providing the SLM can be controlled to shift its image by the pixel shift error. In a preferred embodiment of the invention, the optical elements are manufactured and tested without a surrounding matrix or with a liquid surrounding matrix, which is then solidified when the relative positions of the optical elements are determined. In a preferred embodiment of the invention, the optical processor is calibrated by entering known data and measuring the compressed output.

Figure 8:
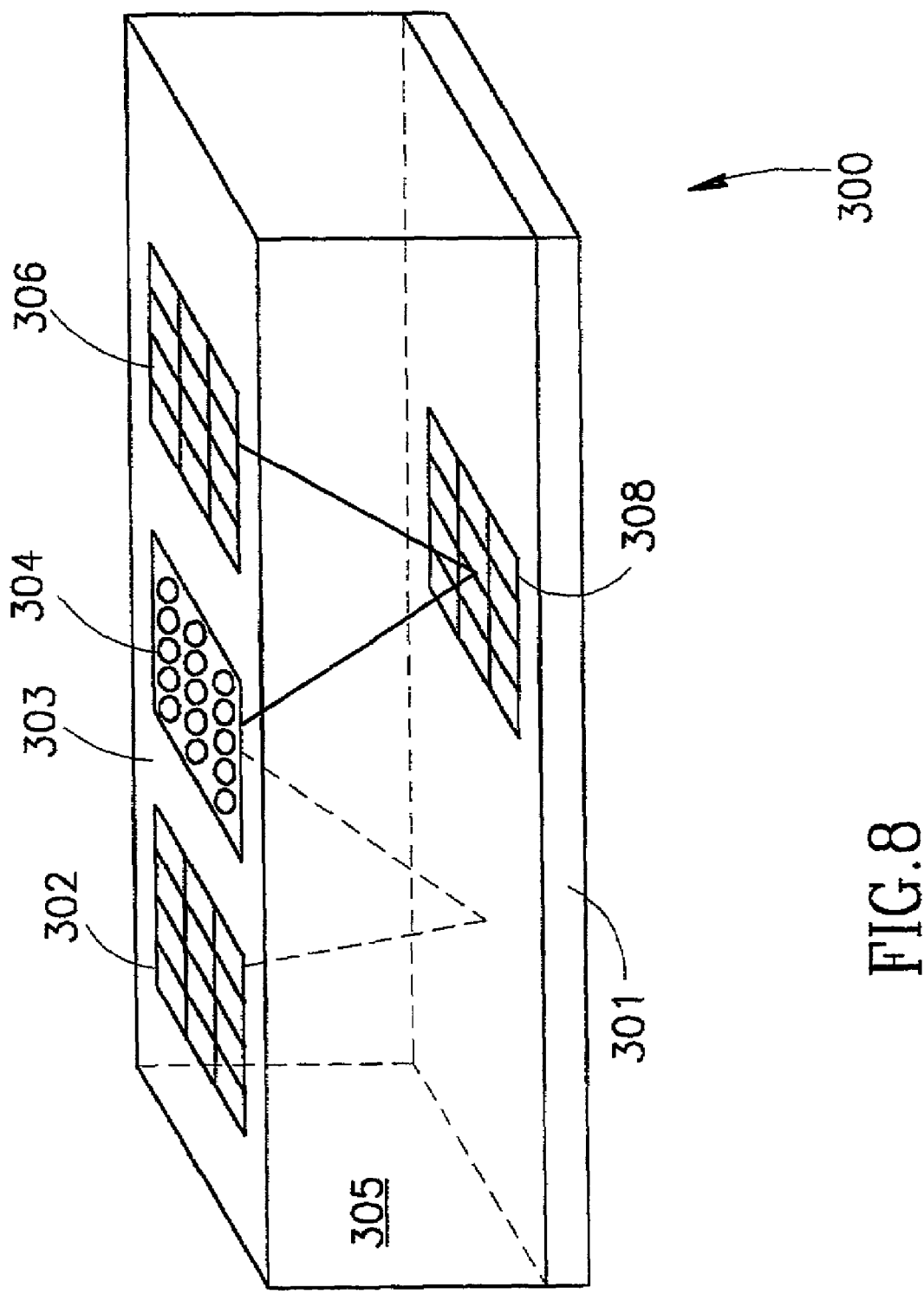
FIG. 8 is a schematic diagram of a lithographic implementation of an optical compression system in accordance with a preferred embodiment of the invention.

FIG. 8 is a schematic diagram of a lithographic implementation of an optical compression system 300 in accordance with a preferred embodiment of the invention. An advantage of lithographic optics is that they can be fabricated in large batches, and, depending on the process, in conjunction with the forming of electronic circuits on a same substrate. It should be noted that most lithographic implementations utilize reflective optics rather than transmissive optics. The above description has focused on transmissive optics, however, reflective optics can also be used for non-lithographic optical processors. Various lithographic implementations will occur to a person skilled in the art, however, an exemplary embodiment is shown in FIG. 8.

System 300 comprises generally of a substrate 301, one or more reflective surfaces 303 which are etched and/or otherwise lithographically processed or micro-machined to form reflective optical elements and an interposing clear medium 305. An SLM or a diode array 302 is used to provide an image. The light is reflected off substrate 301 to a reflective DCT lens 304. The transformed light is reflected back to substrate 301 and then to a CCD or other optical array detector 306. Optionally, the CCD array or other optical, electrical or electro-optical elements may be formed directly on the substrate, for example as indicated by reference 308. In one example, a quantizer, or a holographic reflecting lens are formed at location 308. Possibly, reference 308 indicates an active element, such as an LCD array. Alternatively or additionally, diffractive or refractive elements, for example bi-refringent calcite crystals as described below, may be used in part of the construction of system 300.

In a preferred embodiment of the invention, device 300 is manufactured to DCT a single 8×8 block rather than a whole image. A plurality of systems 300 is preferably used to compress an entire image. Alternatively, system 300 is manufactured to process a single vector rather than an array. Although system 300 may form a part of a dedicated JPEG or MPEG decoder or encoder, in a preferred embodiment of the invention, one or more system 300 type elements are used for the construction of digital signal processor or other integrated circuits, for example to assist in high-end graphical applications.

In one preferred embodiment of the invention, a reflective SLM is coupled directly to a back of a CCD camera. Thus, cheaper, more efficient and/or faster circuitry can be used to couple light input at the CCD to encoding of light reflected by the SLM. In one example, the CCD-SLM sandwich can encode laser light using light from an external object, which impinges on the CCD. In another example, electronic circuitry sandwiched between the SLM and the CCD can perform various electronic processing steps, as suggested herein. Typically, a highly parallel architecture can be achieved, so a higher than standard throughput is envisioned for some implementations. Several variations of such an SLM, especially with the capability of processing the data between the CCD and the SLM, are described in U.S. Pat. No. 5,227,886, the disclosure of which is incorporated herein by reference. These SLMs can use parallel connections between the CCD elements and the SLM elements or serial connections.

The above description has centered on DCT based compression methods. However, other transform based compression methods may also be implemented in accordance with preferred embodiments of the invention. In one example, a wavelet compression method is implemented using a block DWT (discrete wavelet transform). Possibly, there is an overlap between blocks. Such a transform is described, for example in G. Strang and T. Nguyen, "Wavelets and Filter Banks", Wellesly-Cambridge Press, 1997, pp. 502, the disclosure of which is incorporated herein by reference. Preferably, such a wavelet compression implementation includes bit-plane coding techniques such as SPIHT or EZW, possibly implemented using a lookup table.

The above description has centered on image compression, however, in accordance with a preferred embodiment of the invention, optical components are used for compressing other types of signals, for example, audio signals. It is noted, however, that image compression is generally more suitable for transform based compression and being two-dimensional, is more computationally-complex to compress than other types of data.

In the above detailed description, various types of optical data representations are suggested, as well as various types of optical systems. In a preferred embodiment of the invention, the optical representation used is selected to match the optical system, for example, an analog representation for an analog system. in some cases, the data may be converted between representations, to take advantage of particular optical configurations, for example digital optical data may be converted into analog optical data to use a particular lenslet-based implementation of a DCT transforming element.

Many different types of SLMs may be used to practice various embodiments of the present invention. However, in a preferred embodiment of the invention, a binary SLM is used for practicing the present invention or even for performing linear transforms in other applications. In a preferred embodiment of the invention, the data is separated into bit planes and each bit plane is processed separately. Then the bit planes are combined to yield the processed result. The following equation describes the relationship between the Fourier transforming of bit-plane separated and unseparated data:

$$F\left(\sum_i 2^i \vec{d}_i\right) = \sum_i 2^i F(\vec{d}_i)$$

This equation is correct for all linear transforms. In a preferred embodiment of the invention, the data is separated into bit-planes using an electronic circuit, however, also optical means can be used. The data may be represented in several different ways, depending on the specific application, including, spatial encoding where adjacent pixels represent different bits and temporal encoding, where the different bits are temporally separated. Combinations of temporal and spatial separations may also be used. In spatial separations, the bits may be arranged so that the MSB is surrounded by lesser significant bits, so that cross-talk between pixels (groups of bits) will be less likely to cause a modification of the MSB. An alternative binary representation uses separate optical channels (or channel portion) for the different bit planes.

After processing, the processed bit planes may be combined using optical or electronic means. The optical means may be analog or digital. One example of an optical combining means is using a weighted mask which reduces the intensity of light from each bit plane response to the bit position and then all the light is directed to a single CCD pixel. Another example of combining is having each bit illuminate a different CCD pixel and then performing weighted addition on the pixels. Alternatively or additionally, different bit planes may be generated with different intensity values depending on the bit position.

It is contemplated that the use of a binary SLM may be advantageous also for other application using optical processing, for example radar signal processing. By using high speed modulation of parallel data beams, a higher system clock can be provided, possibly even providing a better throughput than electronic processors of a similar size, cost and/or heat dissipation.

Alternatively to a two-level SLM, three-or higher numbers of discrete levels may be provided at the SLM. Alternatively or additionally, although a radix based separation and combination of data is described, other methods can be used to separate the data and recombine it. In one example, a set of optionally orthogonal basis vectors are used to separate the data and recombine it. Such a set of basis vectors may be arbitrary. Alternatively, it may be designed for other reasons, for example, for noise reduction, for distributing noise evenly between bits and/or for matching the basis vector set to a system characteristic, such as a system MTF.

In some cases, the SLM is faster than the propagation time in the processor. Preferably, the processor is treated as a pipe-line in which the SLM and detector are not processing the same data, but rather there is a delay between the SLM and the CCD. Multiple data streams may also be utilized using different frequencies of light. In some cases, either the SLM or the CCD will be faster. Preferably, several instances of the slower element are provided in order not to slow the pipeline. Light from a plurality of SLMs can be collimated to a single optical path and, conversely, light from a single optical path can be projected or copied to a plurality of CCDs. Such mixing and copying is especially useful when different data streams are implemented using different frequencies of light. However, such frequencies may also be differentiated using an active optical filter such as an LCD-color filter-polarizer combination.

The optical processing hardware is preferably dedicated for particular tasks. Alternatively, in some preferred embodiments of the invention, the same hardware components may be used for different steps in a process (such as a DCT component for compression and for motion estimation), for different processes (such as compression and decompression) and/or for different data blocks in a same process, such as in serial processing of data blocks). Alternatively or additionally, the hardware may be programmable, at least to some extent. For example, by modifying the behavior of an SLM and a CCD which form part of a Fourier-based data transform optical component, different type of transforms can be achieved with a single hardware, for example, DCT and DST. Alternatively or additionally, the matching layer may be programmable, for example being an addressable LCD, so that the size and/or location of pinholes can be controlled. Alternatively or additionally, by controlling the opacity of single LCD cells, different continuous spatial filtering configurations can be achieved.

In some preferred embodiments of the invention, the above transforming of data or other processing of data are performed using other optical and electro-optical effects, for example bi-refringent calcite crystals as used in switching networks. Such crystals and exemplary uses are described, for example in "All-Optical Reduced State 4×4 switch", by Dan. M. Marom and David Mendlovic *Optics and Photonics News* March 1996, p. 43, in "Optical Array Generation and Interconnection Using Birefringent Slabs", Tomas W. Stone and James M. Battiato, *Applied Optics*, Vol. 33 No. 2, pp. 182–191 January 1994 and in "Cantor Network, Control Algorithm, Two-Dimensional Compact Structure and its Optical Implementation", by Ning Wang, Liren Liu and Yaozu Yin, *Applied Optics*, Vol. 34 No. 35 P. 8176–8182, December 1995, the disclosures of which are incorporated herein by reference.

Figure 9B:
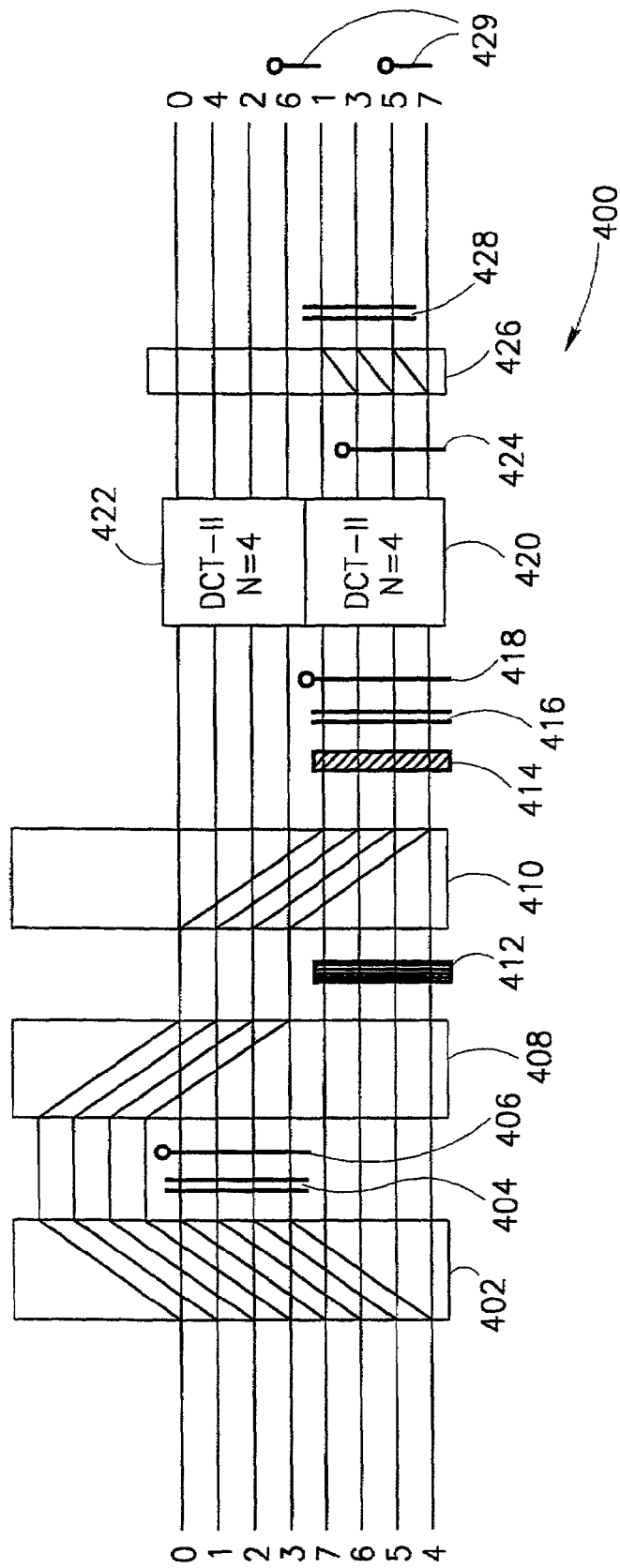
FIG. 9B is a schematic figure of a calcite based DCT transforming optical element, in accordance with a preferred embodiment of the invention.
Figure 10:
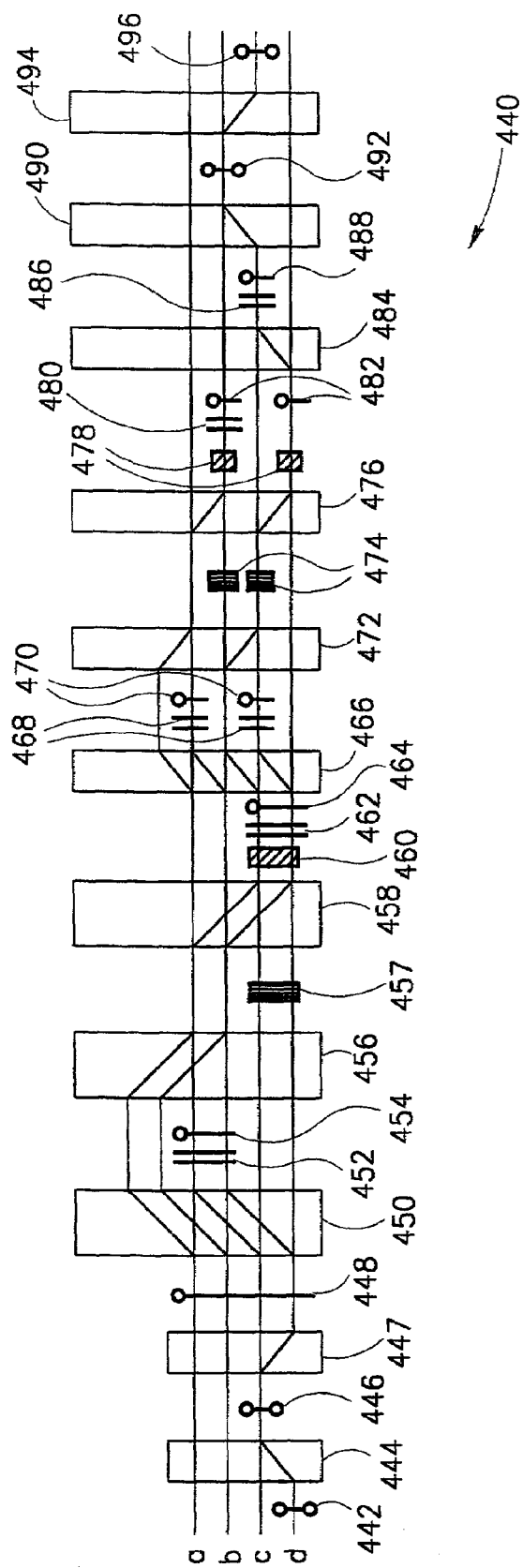
FIG. 10 is a schematic figure of a detail of FIG. 9B.
Figure 10:
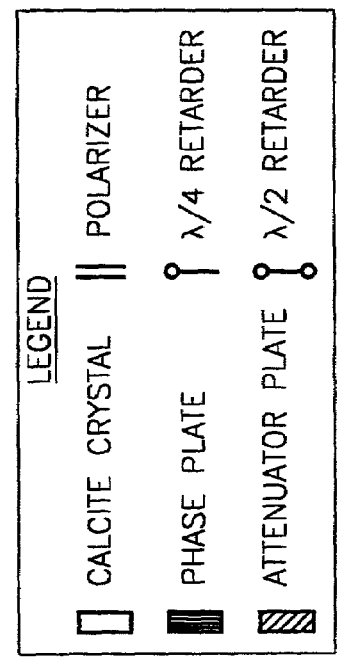

In one preferred embodiment of the invention, an optical processing component is designed to implement a DCT algorithm by simple manipulations of light, such as splitting, adding, subtracting and/or multiplying by various factors. DIF (decimation in frequency) or a DIT (decimation in time) algorithm are considered to be especially suitable in accordance with a preferred embodiment of the invention. However, many other algorithms are known for calculating a DCT and may be implemented in accordance with other preferred embodiments of the present invention. FIGS. 9B and 10 describe an implementation using calcite crystals, attenuators, phase retarders and polarizers to achieve these effects. However, other optical elements may be used instead, for example diffractive optics.

Figure 9A:
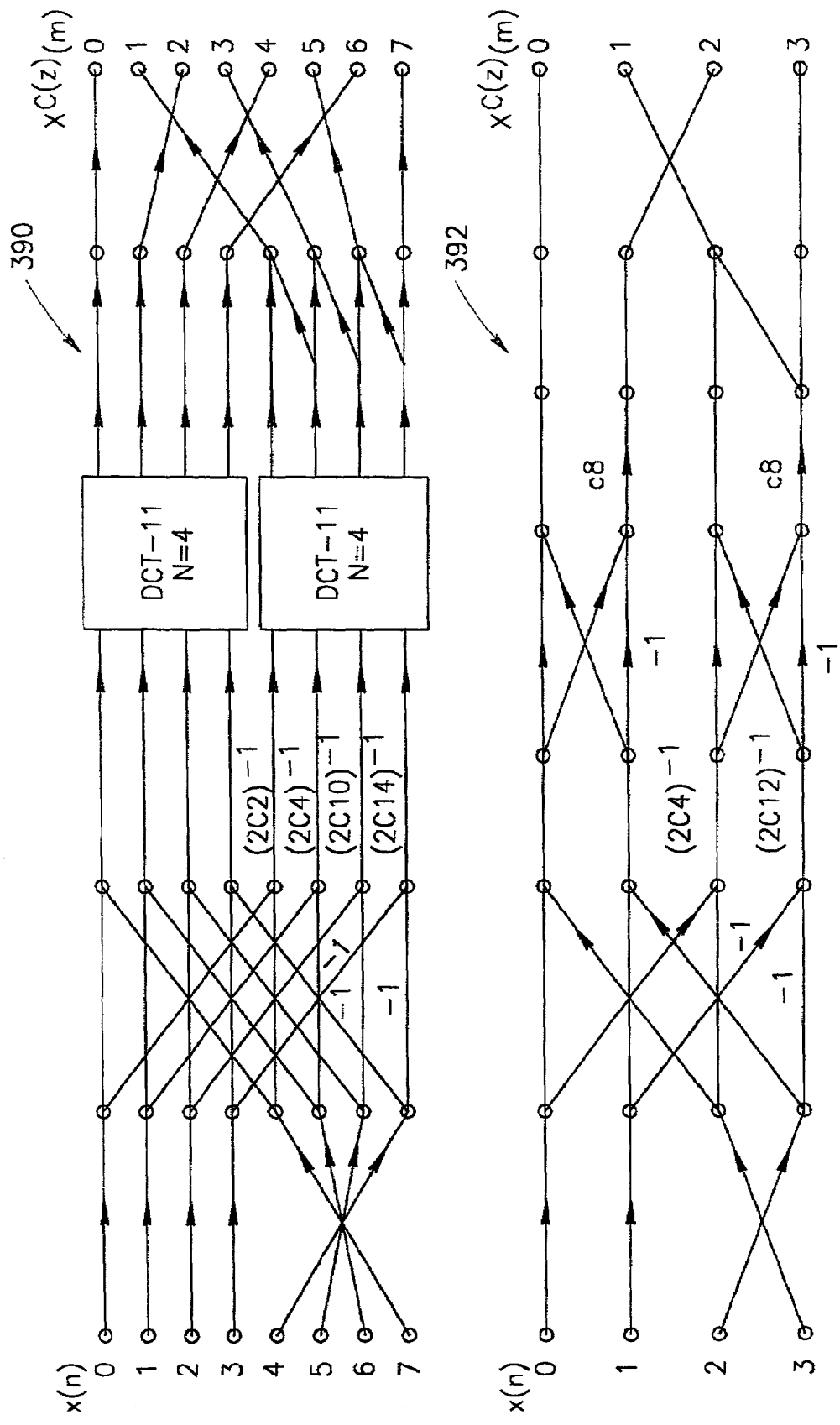
FIG. 9A is a flowchart for a DIF (decimation in time) type of DCT computation.

FIG. 9A is a flowgraph for performing a 8×1 DCT-II using a DIF type algorithm. In the DIF and DIT representations, the input data points are rearranged so into groups, each of which can be recursively evaluated using a lower-order DIF or DIT algorithm Reference 390 is a 8×1 DCT which uses two 4×1 DCT components, indicated by a reference 392. A copy of this figure can be found in "DCT-applications and Algorithms" by P. Yip and K. R. Rao (Academic Press, 1990), page 61, the associated discussion (pp. 56–61) being incorporated herein by reference. FIGS. 9B and 10 illustrate one possible implementation of these flowgraphs. It is noted that due to the differences between optical elements and line diagrams, in some cases single operations are spread out between several optical components or plural operations are combined in a single optical component. Also, although the example shown is of a DCT process, similar embodiments may be used for DFT (discrete Fourier transform) and for DWT (discrete wavelet transform).

FIG. 9B is a schematic figure of a calcite based DCT transforming optical element 400, in accordance with a preferred embodiment of the invention. Eight beams or circularly polarized light, each representing one pixel of an 8 pixel vector are split into two sets of beams by a first calcite crystal 402. One set of beams "ordinary rays" comprise the light that is polarized at 0° to the calcite polarization axis. The other beams, "extraordinary rays" comprise light polarized at 90° to the axis. It should be noted that as the beams are processed, they stop corresponding to the original pixels, however, for convenience, the separate beams of light are referred to in the order in which they are shown in the figure. It should be noted that in some cases, fewer or more beams may be active during the DCT processing stage, even if both the input and the output are for eight rays of light. Four of the split beams (pixels 4–7) are recombined with the other four beams (pixels 0–3) and then polarized by a linear polarizer 404 at 45° and converted into zero axis polarized light by a $\lambda/4$ plate 406. This completes a parallel shift and addition operation on all the pixels. These beams are then spatial recombined with the original beams for pixels 0–3 using a second calcite crystal 408. However, two polarizations are transmitted by crystal 408, the 90° light being further shifted by the following crystal (410). A third calcite crystal 410 is used to combine the beams of pixels 0–3 with phase delayed beams of pixels 4–7, which pixel beams are retarded using a $\lambda/2$ phase plate 412. The result of the combination is attenuated using an attenuator 414, polarized using a polarizer 416 and then converted into circularly polarized light using a $\lambda/4$ plate 418. Each of pixel sets 0–3 and 4–7 are then processed using a DCT-II 4 bit element 420 or 422, described in FIG. 10.

The output of elements 420 and 422 are further processed to yield the final DCT. Beams 4–6 are retarded using a $\lambda/4$ retarding plate 424 and then combined with beams 5–7, using a fourth calcite crystal 426. Beams 5–7 then sum up their two polarizations using a 45° polarizer 428, to yield the DCT result in eight beams.

Typically, but not necessarily, a 2D DCT is desirable. One way of generating a 2D DCT is to apply a DCT to the rows and then process the result by columns. This can be achieved, for example, by chaining two system 400, where one is perpendicular to the other, thus performing first row transforms and then column transforms. Phase information is maintained by the light, so there is no need for separate circuitry to support chaining two DCT elements. A $\lambda/4$ retarder 429 is preferably provided on beams 5–7 of the first system 400, to support the chaining.

In a preferred embodiment of the invention, the system is implemented as a 2×4 array, rather than as a 1×8 array. In one calculated embodiment the system is about 27 times as long as the width of each of the calcite crystals. It is noted that the input and output are not in pixels order. In a preferred embodiment of the invention, the pixel order is generated by suitable wiring of the SLM or of the CCD. In a 2×4 folded embodiment, the required length is calculated to be 18 times the width. It should be noted that the required length can vary by a significant factor depending on engineering considerations, such as materials, folded optical paths and noise considerations.

FIG. 10 is a schematic figure of a 4 pixel DCT element 440, such as elements 420 and 422 of FIG. 9B. Letter indications a–d are used to avoid mix-up with pixel beams 0–7 of FIG. 9B. Again it is noted that as beams a–d are processed, they loose their original meaning and are simply used to designate the ordinal location of the beam in the figure. Beam d is retarded using a $\lambda/2$ retarder 442, then beam c is combined with beam d using a calcite crystal 444. The resulting beam c is retarded again using a $\lambda/2$ retarde6 447 and then split into beam c and beam d using a second calcite crystal 447. Thus, the data in beams c and d is exchanged. A $\lambda/4$ retarder 448 is applied to all the beams, converting them to 45° polarization. Beams c and d are combined with beams a and b using a calcite crystal 450, thus implementing addition operations a+c and b+d. The resulting beams a and b are then combined with the original beams a and b, using a calcite crystal 456, after the result beams being first polarized using a polarizer 452 and then retarded using a $\lambda/4$ plate 454. Beams c and d are delayed using a phase plate 457 and then have beams a and b combined with them, using a calcite crystal 458. This completes a subtraction operation between the original beams—a–d and b–c. The resulting beams c and d are attenuated using an attenuator 460, polarized using a polarizer 462 and retarded using a $\lambda/4$ retarder 464. Beams b–d are then combined with beams a–c, using a calcite crystal 466.

At this point in the process, each pair of beams is processed to yield a 2 input DCT. Beams a and c are polarized using a polarizer 468 and retarded using a $\lambda/4$ retarder 470. A calcite 472 combines the pre-466 crystal a beam with the current a beam and spatially combines the b beam with the current c beam, although they do not have the same polarization and are separated by the next calcite. Beams b and d are delayed using a phase plate 474. A calcite 476 combines beams a and c into beams b and d. Beams b and d are attenuated using an attenuator 478, beam b is polarized using a polarizer 480 and then beams b and d are retarded using a $\lambda/4$ retarder 482. A calcite crystal 484 is used to combine beam d into beam c. The resulting beam c is polarized using a polarizer 486 and is retarded using a $\lambda/4$ retarder 488. A calcite crystal 490 spatially combines beam c into beam b. A $\lambda/2$ retarder 492 retards beam b and a calcite crystal 494 splits out the pre-490 beam c. Elements 490–492 are used to exchange the polarization states of beams b and c. Beam c is then retarded using a $\lambda/2$ retarded 496, generating the DCT result.

The description of FIGS. 9B and 10 have focused on non-programmable embodiments. However, it should be noted that bi-refringent switching networks usually include active elements, which allow outside control of their behavior. An example of such an element is a liquid crystal cell which can selectively (on the application of an electric field) rotate the polarization of a light ray. Another example is a beam switching element which selectively swaps two beams. In some embodiments of the invention, such controllable active elements are used to allow programming of the device, however, in other embodiments this is not required. Programming is especially useful for allowing a single component to function in different ways for example for different image portions, for compression or decompressing and/or for different steps of processing.

It will be appreciated that the above described methods of optical processing may be varied in many ways, including, changing the order of steps, which steps are performed using electrical components and which steps are performed using optical components, the representation of the data and/or the hardware design. In addition, various distributed and/or centralized hardware configurations may be used to implement the above invention. In addition, a multiplicity of various features, both of methods and of devices, have been described. It should be appreciated that different features may be combined in different ways. In particular, not all the features shown above in a particular embodiment are necessary in every similar preferred embodiment of the invention. Further, combinations of the above features are also considered to be within the scope of some preferred embodiments of the invention. In addition, the scope of the invention includes methods of using, constructing, calibrating and/or maintaining the apparatus described herein. When used in the following claims, the terms "comprises", "comprising", "includes", "including" or the like mean "including but not limited to".

The invention claimed is:

1. A method of data processing, comprising:
   providing image-data in an image space that encodes light as a spaced-apart discrete input set with dead spaces between all input set elements wherein each element is windowed by a first window function;
   transforming said light from the image space to a transform space utilizing a continuous optical Fourier transforming component; and
   windowing spatially discrete regions in the transform space with a second window function that is related to the first window function by a matching condition so that at least one of intensities and phases of transformed light in the transform space regions are proportional to coefficients of a discrete transform of the input set; and
   detecting data carried by said transformed light at the spatially discrete sampler regions.

2. A method according to claim 1, wherein windowing comprises using a matching component.

3. A method according to claim 1, comprising compressing or decompressing said data using a transform-type compression/decompression method that uses said transforming.

4. A method according to claim 3, wherein said transforming comprises transforming using one or more optical elements which perform a block transform.

5. A method according to claim 4, wherein said one or more optical elements comprises a matrix of optical lens elements.

6. A method according to claim 4, wherein said one or more optical elements comprises an element which performs a vector by matrix multiplication.

7. A method according to claim 4, wherein said one or more optical element comprises a refractive element.

8. A method according to claim 7, wherein said refractive element comprises a bi-refringent material.

9. A method according to claim 4, wherein said one or more optical elements comprises an element which generates a matrix product.

10. A method according to claim 9, wherein said matrix product comprises a triple matrix product.

11. A method according to claim 3, wherein said compression is a JPEG compression.

12. A method according to claim 3, wherein said compression is a MPEG compression.

13. A method according to claim 3, wherein said compression is a wavelet compression.

14. A method according to claim 3, wherein said data represents an image sequence.

15. A method according to claim 1, comprising post-processing said data to generate data that represents a transform other than a Fourier transform.

16. A method according to claim 15, wherein said post-processing comprises optically postprocessing.

17. A method according to claim 15, wherein said post-processing comprises spatially modulating said light.

18. A method according to claim 15, wherein said pre-processing comprises mirroring said data.

19. Apparatus for optically processing data, comprising:
   an input for receiving data;
   a spatially modulated light source responsive to said input for presenting said input as a spaced apart discrete input set with dead spaces between all input set elements;
   at least one continuous Fourier transforming optical component for transforming said data between an image space and a transform space, using a two dimensional signed discrete linear transform; and
   a spatially discrete sampler for sampling at locations corresponding to said discrete transform.

20. Apparatus according to claim 19, wherein said received data comprises uncompressed image data and comprising a processor for processing said data after said transform to yield compressed image data to be outputted.

21. Apparatus according to claim 20, wherein said processor performs at least some of its processing on optic waves.

22. Apparatus according to claim 20, wherein said processor performs at least some of its processing on electronic signals.

23. Apparatus according to claim 19, wherein said received data comprises compressed image data and comprising a processor for processing said data before said transform to yield transform data to be transformed by said optical component.

24. Apparatus according to claim 19, comprising an optical motion estimator.

25. Apparatus according to claim 24, wherein said optical motion estimator utilizes said optical component for optical motion estimation.

26. Apparatus according to claim 24, wherein said optical motion estimator includes at least one electronic component.

27. Apparatus according to claim 19, comprising an optical motion compensator.

28. Apparatus according to claim 27, wherein said optical motion compensator includes at least one electronic component.

29. Apparatus according to claim 19, wherein said data comprises an image sequence.

30. Apparatus according to claim 19, wherein said data is manipulated as blocks.

31. Apparatus according to claim 19, wherein said optical component comprises a holographic lens.

32. Apparatus according to claim 19, wherein said optical component comprises a matrix product calculating element.

33. Apparatus according to claim 19, wherein said light source comprises a binary SLM (spatial light modulator).

34. Apparatus according to claim 19, wherein said input is matched to said output to account for non-point light sources and detectors.

35. Apparatus according to claim 19, wherein said apparatus processes a plurality of data blocks in parallel.

36. Apparatus according to claim 35, wherein different data blocks are encoded differently, to reduce cross-talk between them.

37. Apparatus according to claim 35, comprising light attenuators arranged to attenuate light leaking between areas processing different data blocks.

38. Apparatus according to claim 19, wherein said optical component comprises a bi-refringent material.

39. Apparatus according to claim 19, wherein said input receives light waves from an imaged object and wherein said input spatially samples said light.

40. Apparatus according to claim 39, comprising a detector that converts said data into electrical signals.

41. Apparatus according to claim 40, comprising an electronic quantizer which quantizes said electronic signals to produce compressed data.

42. Apparatus according to claim 39, comprising a storage unit for storing at least one set of said electronic signals, corresponding to an image sequence.

43. A single integrated multi-block-transform optical element, comprising:

a plurality of optical groups each group comprising at least one optical sub-element, wherein each of said optical groups optically transforms a block of data using a signed linear discrete transform, wherein said block is part of a data set divided into blocks for block-transforming, including at least one other block being transformed in parallel by another optical group of said integrated element and said data is arranged as a spatially impulse image.

44. An element according to claim 43, wherein said optical groups perform said transforming using a discrete optical component that applies a transform.

45. An element according to claim 43, wherein said at least one sub-element comprises a lenslet array portion.

46. An element according to claim 43, wherein said plurality of optical groups are arranged as a matrix.

47. An element according to claim 43, wherein said transform comprises a non-separable transform.

\* \* \* \* \*

UNITED STATES PATENT AND TRADEMARK OFFICE
CERTIFICATE OF CORRECTION

PATENT NO. : 7,194,139 B1 Page 1 of 1
APPLICATION NO. : 09/926547
DATED : March 20, 2007
INVENTOR(S) : Aviram Sariel et al.

It is certified that error appears in the above-identified patent and that said Letters Patent is hereby corrected as shown below:

In the Claims:

Delete Column 32, lines 19-67

Delete Column 33, lines 1-24

Delete Column 34, lines 1-22

Signed and Sealed this

Second Day of February, 2010

David J. Kappos
*Director of the United States Patent and Trademark Office*